United States Patent
Matsushita et al.

(10) Patent No.: US 8,977,461 B2
(45) Date of Patent: Mar. 10, 2015

(54) VEHICLE CONTROL SYSTEM

(75) Inventors: Koki Matsushita, Susono (JP); Shin Noumura, Susono (JP); Ken Koibuchi, Hadano (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 273 days.

(21) Appl. No.: 13/522,739

(22) PCT Filed: Dec. 29, 2010

(86) PCT No.: PCT/IB2010/003356
§ 371 (c)(1),
(2), (4) Date: Jul. 18, 2012

(87) PCT Pub. No.: WO2011/089468
PCT Pub. Date: Jul. 28, 2011

(65) Prior Publication Data
US 2012/0296541 A1    Nov. 22, 2012

(30) Foreign Application Priority Data
Jan. 19, 2010   (JP) ................................. 2010-009335

(51) Int. Cl.
*G06F 7/70*       (2006.01)
*G06F 19/00*    (2011.01)
(Continued)

(52) U.S. Cl.
CPC ............. *F02D 11/105* (2013.01); *B60W 10/06* (2013.01); *B60W 10/10* (2013.01); *B60W 50/06* (2013.01); *F02D 41/045* (2013.01); *F02D 41/107* (2013.01); *F02D 2200/602* (2013.01)
USPC .......................................................... 701/70

(58) Field of Classification Search
USPC .......................................................... 701/70
See application file for complete search history.

(56) References Cited

U.S. PATENT DOCUMENTS 4,258,591 A * 3/1981 Eckert et al. ................... 477/125
4,955,346 A * 9/1990 Kaneyasu et al. ............. 123/399

(Continued)

FOREIGN PATENT DOCUMENTS

DE    101 56 948 A1    6/2003
DE    103 45 407 A1    4/2004

(Continued)

OTHER PUBLICATIONS

International Search Report issued in International Patent Application No. PCT/IB2010/003356 dated May 19, 2011.

(Continued)

*Primary Examiner* — Nicholas Kiswanto
(74) *Attorney, Agent, or Firm* — Oliff PLC

(57) ABSTRACT

When the operating speed of an accelerator pedal is higher than a given operating speed, a target acceleration as a target output value is multiplied by a gain so that an absolute value of the target acceleration is increased; therefore, a large acceleration requested by the driver can be achieved. The gain by which the target acceleration is multiplied is set to 1 when the target acceleration is about zero, so as to resume a condition where the absolute value of the target acceleration is not increased. Thus, when the control of increasing the absolute value of the target acceleration with the gain is stopped, an elevation change is less likely or unlikely to occur in the actual acceleration. Consequently, a desired acceleration is generated without causing the driver to feel uncomfortable during driving of the vehicle.

8 Claims, 7 Drawing Sheets

(51) Int. Cl.
*G06G 7/00* (2006.01)
*G06G 7/76* (2006.01)
*F02D 11/10* (2006.01)
*B60W 10/06* (2006.01)
*B60W 10/10* (2012.01)
*B60W 50/06* (2006.01)
*F02D 41/04* (2006.01)
*F02D 41/10* (2006.01)

(56) References Cited

U.S. PATENT DOCUMENTS

| | | | | |
|---|---|---|---|---|
| 4,964,051 | A | * | 10/1990 | Sekozawa et al. ............ 701/102 |
| 5,025,380 | A | * | 6/1991 | Wataya et al. ............... 701/103 |
| 5,048,633 | A | * | 9/1991 | Takehara et al. ............. 180/197 |
| 5,499,953 | A | * | 3/1996 | Hayasaki ..................... 477/120 |
| 5,584,541 | A | * | 12/1996 | Sone et al. ................... 303/146 |
| 6,379,282 | B1 | * | 4/2002 | Aoki ............................ 477/109 |
| 6,718,255 | B1 | | 4/2004 | Okubo |
| 7,121,238 | B2 | * | 10/2006 | Minami et al. ............. 123/90.15 |
| 7,228,233 | B2 | * | 6/2007 | Kimura et al. ............... 701/301 |
| 2003/0060961 | A1 | | 3/2003 | Ishizu et al. |
| 2003/0120412 | A1 | | 6/2003 | Mayer |
| 2004/0204799 | A1 | | 10/2004 | Hurley et al. |
| 2007/0192006 | A1 | * | 8/2007 | Kimura et al. ................. 701/45 |
| 2010/0235061 | A1 | | 9/2010 | Fujiwara et al. |
| 2013/0166101 | A1 | * | 6/2013 | Noumura et al. ................. 701/1 |

FOREIGN PATENT DOCUMENTS

| | | |
|---|---|---|
| DE | 10 2005 002 265 A1 | 8/2006 |
| JP | A-04-244434 | 9/1992 |
| JP | A-5-1578 | 1/1993 |
| JP | A-9-303185 | 11/1997 |
| JP | A-2003-170759 | 6/2003 |
| JP | A-2003-237421 | 8/2003 |
| JP | A-2004-17925 | 1/2004 |
| JP | A-2004-276669 | 10/2004 |
| JP | A-2005-171761 | 6/2005 |
| JP | A-2005-233088 | 9/2005 |
| JP | A-2006-94688 | 4/2006 |
| JP | A-2007-30679 | 2/2007 |
| JP | A-2007-113537 | 5/2007 |
| JP | A-2007-247579 | 9/2007 |
| JP | A-2011-126423 | 6/2011 |
| JP | A-2011-148341 | 8/2011 |
| JP | A-2011-148342 | 8/2011 |
| JP | A-2011-149454 | 8/2011 |
| WO | WO 2009/063290 A1 | 5/2009 |

OTHER PUBLICATIONS

Written Opinion issued in International Patent Application No. PCT/IB2010/003356 dated May 19, 2011.

Office Action issued in Japanese Application No. 2010-009335 issued Aug. 28, 2013.

* cited by examiner

VEHICLE CONTROL SYSTEM

INCORPORATION BY REFERENCE

The disclosure of Japanese Patent Application No. 2010-009335 filed on Jan. 19, 2010, including the specification, drawings and abstract is incorporated herein by reference in its entirety.

BACKGROUND OF THE INVENTION

1. Field of the Invention

The invention relates to a vehicle control system.

2. Description of the Related Art

The vehicle control system calculates target driving force based on the stroke (i.e., the amount of depression) of the accelerator pedal operated by the driver, and controls a drive system so that the drive system generates the target driving force requested by the driver. However, since the driver changes the manner of operating the accelerator pedal depending on a target acceleration, the driver's request or demand may not be satisfied if the target driving force is calculated only based on the accelerator pedal stroke. Therefore, some known types of vehicle control systems perform driving control, using operation information other than the accelerator pedal stroke.

For example, in a vehicle motion control system as described in Japanese Patent Application Publication No. 2007-247579 (JP-A-2007-247579), the relationship between the accelerator operating speed and the target jerk is set to be variable according to the intention of the driver, and the target jerk is set based on the relationship. Then, a first target acceleration is calculated from the accelerator operating amount; and a second target acceleration that changes relative to the first target acceleration according to the target jerk is calculated, so that driving force is generated based on the second target acceleration. Thus, the second target acceleration is calculated by correcting the first target acceleration calculated from the accelerator operating amount represented by the accelerator pedal stroke, based on the target jerk set based on the relationship with the operating speed of the accelerator pedal; therefore, the target acceleration can be calculated, using operation information other than the accelerator pedal stroke, and the actual acceleration can be made closer to the acceleration requested by the driver.

However, if the target acceleration is corrected using information other than the accelerator pedal stroke, an elevation change or stepped change in the acceleration may occur when the control system returns from a condition where the correction is conducted, to a condition of normal acceleration control, and the driver may feel uncomfortable when such a change occurs in the acceleration.

SUMMARY OF INVENTION

The invention has been developed in view of the above-described situation, and provides a vehicle control system that is able to make the driver less likely or unlikely to feel uncomfortable during driving of the vehicle, while achieving a desired acceleration.

According to one aspect of the invention, there is provided a vehicle control system capable of performing running control of a vehicle by multiplying a target output value by a gain, which control system is characterized in that the gain by which the target output value is multiplied is returned to an initial value when the target output value is about zero.

In the vehicle control system as described above, it is preferable that the target output value is calculated based on an operating amount of an accelerator member, and the gain is set to a value corresponding to an operation of the accelerator member, and that the target output value is multiplied by the gain so that an absolute value of the target output value is increased, and the gain by which the target output value is multiplied is returned to a condition in which the absolute value is not increased, when the target output value becomes close to zero.

In the vehicle control system as described above, it is preferable that, when an operating speed of the accelerator member in a direction in which the accelerator member is released is higher than a given operating speed, an increasing correction to increase the absolute value of the target output value is conducted, and the increasing correction is stopped depending on a manner of operating the accelerator member.

In the vehicle control system as described above, in the case where the increasing correction is conducted when the operating speed of the accelerator member in the direction in which the accelerator member is released is higher the given operating speed, it is preferable to stop the increasing correction when the operation of the, accelerator member is stopped partway.

In the vehicle control system as described above, in the case where the increasing correction is conducted when the operating speed of the accelerator member in the direction in which the accelerator member is released is higher than the given operating speed, and the accelerator member is returned to the fully released position, it is preferable to stop the increasing correction when the accelerator member is depressed again.

In the vehicle control system as described above, it is preferable that the increasing correction is to increase the absolute value of the target output value by multiplying the target output value by the gain.

In the vehicle control system as described above, it is preferable that the increasing correction is to increase the absolute value of the target output value by shifting the target output value by an offset value.

The vehicle control system according to the present invention increases the absolute value of the target output value by multiplying the target output value by the gain that depends on the operation of the accelerator member; therefore, when the driver requests a large acceleration, the requested acceleration can be achieved. Also, when the target output value becomes close to 0, the gain by which the target output value is multiplied is returned to a condition or value where the absolute value of the target output value is not increased; therefore, when the control of increasing the absolute value of the target output value with the gain is stopped, an elevation change or stepped change in the actual acceleration is less likely to occur or prevented from occurring. Consequently, the vehicle control system makes the driver less likely or unlikely to feel uncomfortable during driving of the vehicle, while achieving a desired acceleration.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

A vehicle control system according to one embodiment of the invention will be described in detail with reference to the drawings. It is to be understood that this invention is not limited to the following embodiment. It is also to be understood that constituent elements of the invention include elements with which a person skilled in the art could easily replace constituent elements of the following embodiment, and elements that are substantially identical with the constituent elements of the embodiment.

Figure 1:
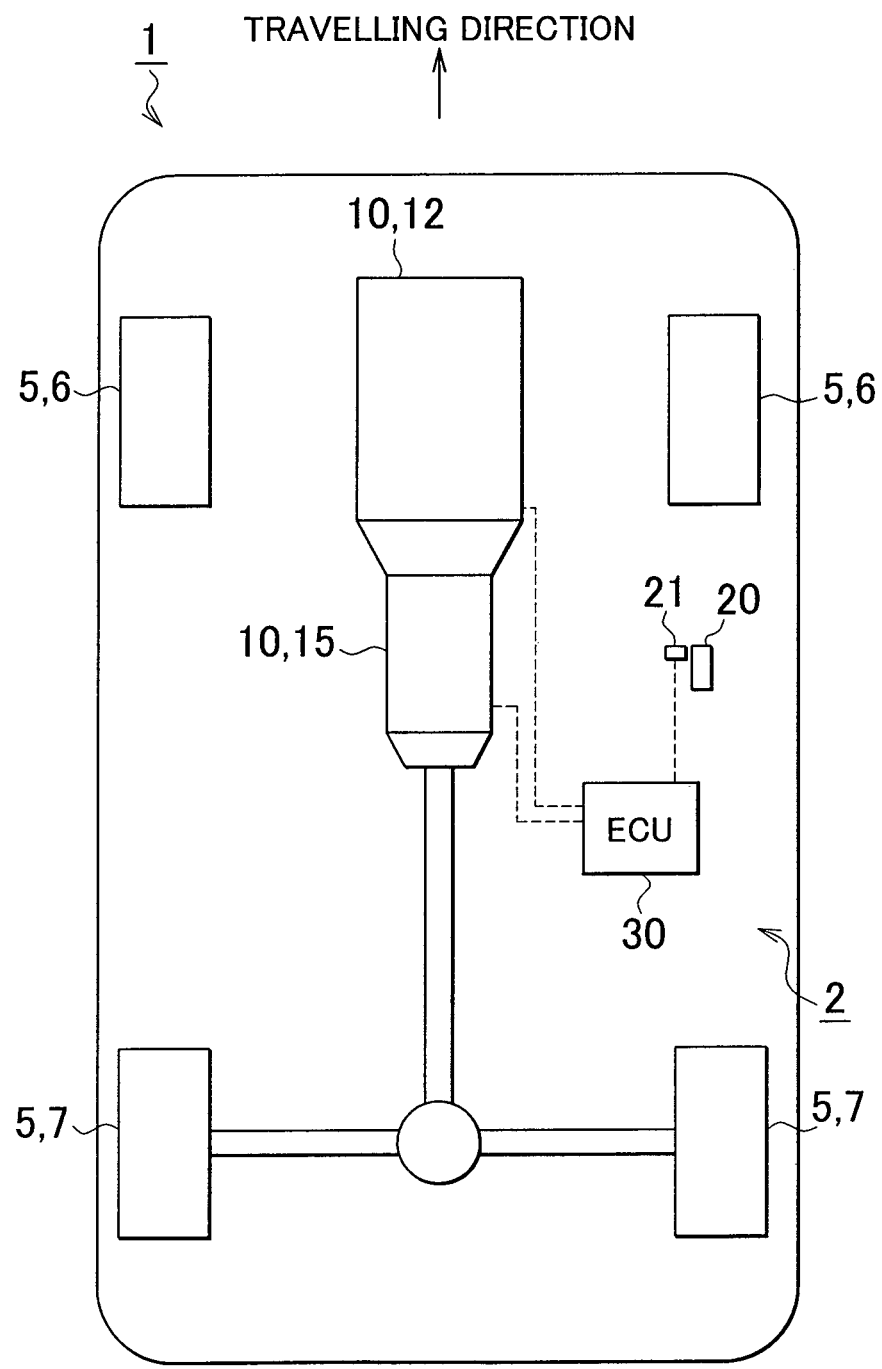
FIG. 1 is a schematic view of a vehicle in which a vehicle control system according to one embodiment of the invention is provided.

FIG. 1 is a schematic view of a vehicle in which the vehicle control system according to the embodiment of the invention is provided. An engine 12 as an internal combustion engine is installed as a power source on the vehicle 1 including the vehicle control system 2 of this embodiment, and the vehicle 1 is able to run with power of the engine 12. An automatic transmission 15 as one example of gear shifting device is connected to the engine 12, and the power generated by the engine 12 is adapted to be transmitted to the automatic transmission 15. The automatic transmission 15 has a plurality of gear positions having different speed ratios or gear ratios. In operation, the power passed through the automatic transmission 15 for change of speed is transmitted as driving force to right and left rear wheels 7 as driving wheels, of the wheels 5 of the vehicle 1, via a power transmission path, so that the vehicle 1 is able to run with the driving force thus transmitted. Thus, the engine 12, automatic transmission 15, and other devices constitute a drive system 10 capable of transmitting driving force to the rear wheels 7 as driving wheels.

The vehicle 1 is provided with an accelerator pedal 20 as an accelerator member operated by the driver, and an accelerator stroke sensor 21 operable to detect the accelerator pedal stroke as the amount of depression of the accelerator pedal 20. The drive system 10 is arranged to generate driving force according to the accelerator pedal stroke.

The vehicle 1 including the vehicle control system 2 of this embodiment is a so-called rear-wheel-drive vehicle in which power generated by the engine 12 is transmitted to the rear wheels 7 and driving force is generated at the rear wheels 7. However, the vehicle 1 may be of a drive type other than the rear-wheel-drive type, for example, may be a front-wheel-drive vehicle in which driving force is generated at front wheels 6, or a four-wheel-drive vehicle in which driving force is generated at all of the wheels 5. The engine 12 as the internal combustion engine may be a reciprocating, spark ignition engine, or a reciprocating, compression ignition engine. The drive system 10 may use a power source other than the internal combustion engine. For example, the drive system 10 may be of an electric type, using an electric motor as a power source, or may be of a hybrid type, using both the engine 12 and an electric motor.

The engine 12 and the automatic transmission 15 that constitute the drive system 10 are connected to an ECU (Electronic Control Unit) 30 that is installed on the vehicle 1 and controls each part of the vehicle 1, and the engine 12 and the automatic transmission 15 operate under control of the ECU 30. The accelerator stroke sensor 21 is also connected to the ECU 30, and a driver request entered through operation of the accelerator pedal 20 is transmitted from the accelerator stroke sensor 21 to the ECU 30.

Figure 2:
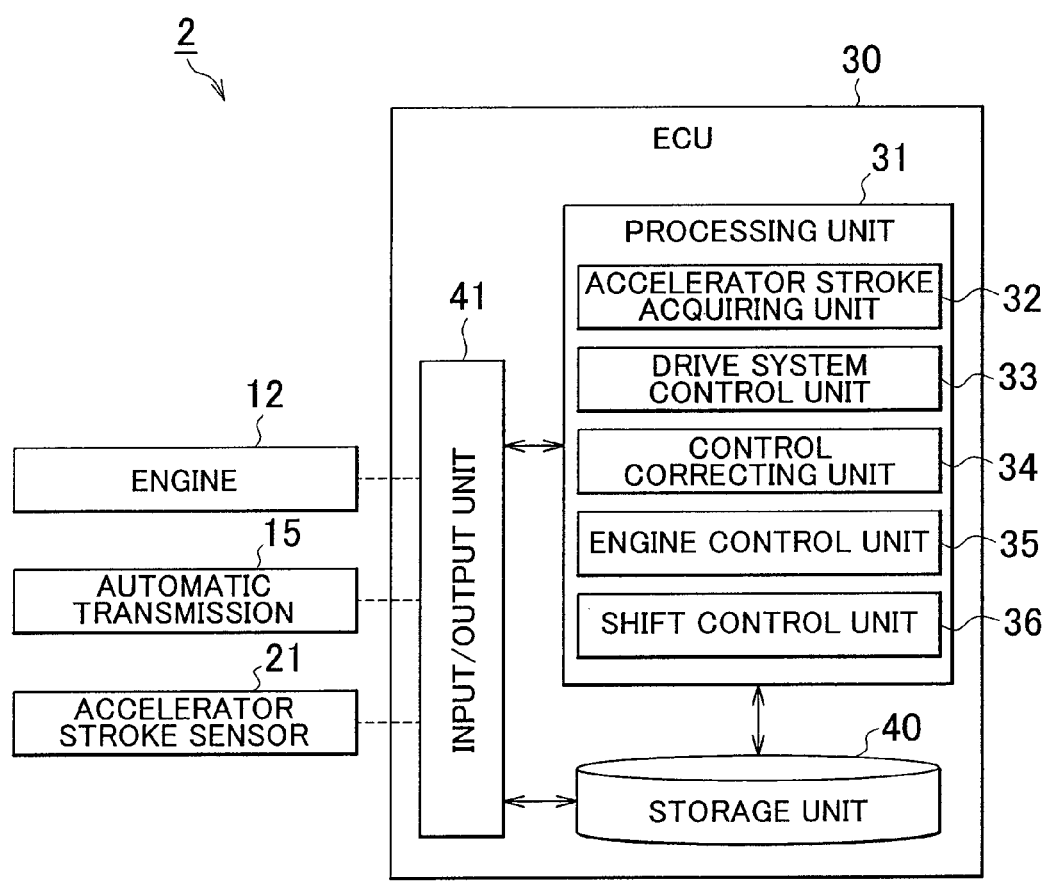
FIG. 2 is a view showing the arrangement of principal parts of the vehicle control system according to the embodiment.

FIG. 2 shows the arrangement of principal parts of the vehicle control system as shown in FIG. 1. The ECU 30 includes a processing unit 31, storage unit 40 and an input/output unit 41, which are connected to each other such that signals can be transmitted between these units. The engine 12, automatic transmission 15, and the accelerator stroke sensor 21 are connected to the input/output unit 41, and the input/output unit 41 transmits and receives signals to and from the engine 12 and other devices. Also, computer programs for controlling the vehicle control system 2 are stored in the storage unit 40.

The processing unit 31 includes an accelerator stroke acquiring unit 32 capable of acquiring the accelerator pedal stroke as the stroke or operating amount of the accelerator pedal 20 based on at least the result of detection by the accelerator stroke sensor 21, a drive system control unit 33 that calculates a controlled variable of the drive system 10 based on the accelerator pedal stroke acquired by the accelerator stroke acquiring unit 32, and controls the drive system 10, and a control correcting unit 34 that determines whether the operating speed of the accelerator pedal 20 is higher than a given operating speed, and corrects the controlled variable of the drive system 10 calculated by the drive system control unit 33 when the operating speed of the accelerator pedal 20 is higher than the given operating speed. The processing unit 31 further includes an engine control unit 35 that controls the operation of the engine 12, based on the controlled variable calculated by the drive system control unit 33, and a shift control unit 36 that performs shift control of the automatic transmission 15, based on the controlled variable calculated by the drive system control unit 33.

When the ECU 30 controls the vehicle control system 2, the processing unit 31 performs computations according to the computer programs read into a memory incorporated in the processing unit 31, and operates the engine 12 and other devices according to the results of computations. The processing unit 31 stores numerical values obtained during computations, into the storage unit 40 as needed, and retrieves the numerical values thus stored, so as to carry out computations.

In the following, the operation of the vehicle control system 2 constructed as described above according to this embodiment will be described. During running of the vehicle 1, the accelerator stroke sensor 21 detects the accelerator pedal stroke as the operating amount of the accelerator pedal 20 operated by the driver, and the accelerator stroke acquiring unit 32 included in the processing unit 31 of the ECU 30 acquires the result of the detection. The accelerator pedal stroke acquired by the accelerator stroke acquiring unit 32 is transmitted to the drive system control unit 33 included in the processing unit 31 of the ECU 30, and the drive system control unit 33 calculates a target output value as an output value to be achieved during running of the vehicle 1, based on the accelerator pedal stroke. On the basis of the target output value, the controlled variable that causes the drive system 10 to generate driving force requested by the driver is determined.

The target output value may be of any type provided that it is a value that can be controlled when running control of the vehicle is performed. While a variety of values may be used as a target output value, target torque as torque to be achieved when the torque generated from the engine 12 or torque generated from the automatic transmission 15 is controlled, or target driving force as driving force to be achieved when the driving force generated at the driving wheels is controlled, or the like, may be used as a target output value. Also, the target output value is not limited to those as described above representing the magnitude of direct force, but a target acceleration as a target value of the acceleration that is a controlled value during running of the vehicle 1 may be used as a target output value. Thus, any value that can be controlled during running of the vehicle 1 may be treated or used as a target output value. The following description is concerned with the case where the target acceleration is used as one example of target output value.

The target acceleration calculated by the drive system control unit 33 is transmitted to the engine control unit 35 and shift control unit 36 included in the processing unit 31 of the ECU 30. The engine control unit 35 controls power generated by the engine 12, by controlling each part of the engine 12, such as a fuel injector (not shown) and a throttle valve (not shown), based on the target acceleration thus transmitted.

The shift control unit 36 performs shift control of the automatic transmission 15, based on the target acceleration transmitted from the drive system control unit 33, results of detection by a vehicle speed sensor (not shown) that detects the vehicle speed during running, etc., so as to establish a gear position or gear ratio suitable for the driver-requested driving force and the vehicle speed. The power of the engine 12 controlled by the engine control unit 35 is transmitted to the automatic transmission 15, where the speed of rotation is changed at the speed ratio suitable for the running conditions of the vehicle 1, and is then transmitted to the rear wheels 7 via the power transmission path. As a result, the rear wheels 7 as the driving wheels are rotated, and the vehicle 1 runs with the speed and driving force controlled according to the accelerator pedal stroke.

While the power generated by the engine 12 is controlled and shifting of the automatic transmission 15 is effected according to the accelerator pedal stroke, during running of the vehicle 1, the power control and shift control are performed according to not only the accelerator pedal stroke, but also the operating speed at which the accelerator pedal 20 is operated. Namely, the vehicle control system 2 of this embodiment sets a gain of the controlled variable of the drive system 10 in accordance with the operating speed at which the accelerator pedal 20 is operated, and corrects the controlled variable of the drive system 10 with the gain, or corrects the controlled variable as a target value, using an offset amount, so as to control the vehicle 1 during running.

More specifically, the above-described corrections are made when the accelerator pedal 20 is operated at an operating speed that is higher than a speed based on which it can be determined that the accelerator pedal 20 is operated at a normal operating speed. For example, when the accelerator pedal 20 is depressed for acceleration of the vehicle 1, at an operating speed that is higher than a given operating speed set for the case of depression, the control correcting unit 34 included in the processing unit 31 of the ECU 30 determines that quick depression of the accelerator pedal 20 takes place. When it is determined that quick depression of the accelerator pedal 20 takes place, the control correcting unit 34 increases a gain of the target acceleration, and the drive system control unit 33 corrects the target acceleration with the gain thus increased when it calculates the target acceleration.

When the accelerator pedal 20 that has been is in a depressed state is released at an operating speed that is higher than a given operating speed, the control correcting unit 34 determines that quick release of the accelerator pedal 20 takes place, and, in this case, determines an offset amount of the target acceleration. While the drive system control unit 33 calculates a target acceleration in the direction of deceleration (i.e., in a negative direction) when the accelerator pedal 20 is returned, the control unit 33 calculates an offset amount in the direction of deceleration when it determines that quick release of the accelerator pedal 20 takes place, and shifts or corrects the target acceleration in the direction of deceleration with the offset amount. While the target acceleration is corrected by adding the offset amount to the target acceleration, the correction of the target acceleration with the offset amount added thereto may be referred to as an increasing correction to increase the absolute value of the target acceleration.

The given operating speed used when determining whether quick depression or quick release of the accelerator pedal 20 takes place, based on the operating speed of the accelerator pedal 20, is set in advance and stored in the storage unit 40 of the ECU 30. The quick depression of the accelerator pedal 20 mentioned in this specification represents a condition where the operating speed at which the accelerator pedal 20 is depressed is higher than the given operating speed set for the case of pedal depression and stored in the storage unit 40. The quick release Of the accelerator pedal 20 represents a condition where the operating speed at which the accelerator pedal 20 that has been in a depressed state is returned is higher than the given operating speed set for the case of pedal release and stored in the storage unit 40.

Figure 3:
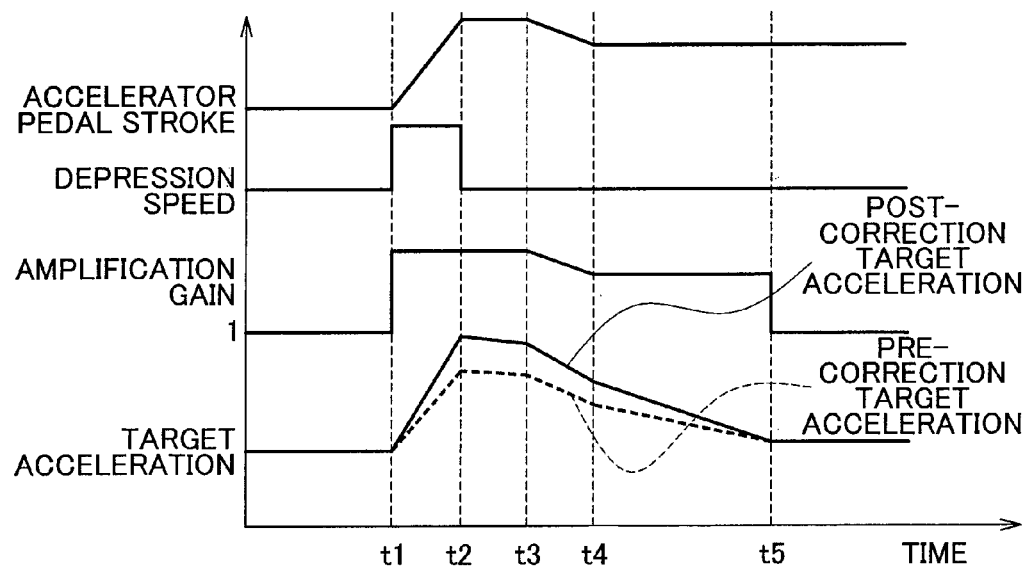
FIG. 3 is an explanatory view showing changes in the target acceleration when the accelerator pedal is quickly depressed.

FIG. 3 is an explanatory view showing changes in the target acceleration when the accelerator pedal is quickly depressed. As one example of control executed when the operating speed of the accelerator pedal 20 is higher than a given operating speed, control executed upon quick depression of the accelerator pedal 20 will be initially explained. If the accelerator pedal 20 is abruptly depressed during running of the vehicle 1, the accelerator pedal 20 moves in a direction to increase the pedal stroke, at a large depression speed. The control correcting unit 34 determines whether quick depression of the accelerator pedal 20 takes place, by comparing the speed or rate of change of the accelerator pedal stroke acquired by the accelerator stroke acquiring unit 32 when the accelerator pedal 20 is depressed, with the given operating speed which is stored in the storage unit 40 of the ECU 30 and used for determining whether quick depression of the accelerator pedal 20 takes place. Namely, when the control correcting unit 34 determines that a quick-depression determination value as the depression speed of the accelerator pedal 20 acquired by the accelerator stroke acquiring unit 32 is higher (i.e., faster) than the given operating speed stored in the storage unit 40, it determines that quick depression of the accelerator pedal 20 takes place (FIG. 3, t1). More specifically, when it is determined whether quick depression of the accelerator pedal 20 takes place, a differential value representing the rate of change of the accelerator pedal stroke is used. If the differential value exceeds a threshold value, it is determined that quick depression of the accelerator pedal 20 takes place.

If it is determined that quick depression of the accelerator pedal 20 takes place, the control correcting unit 34 sets an amplification gain as a gain used for increasing the target acceleration, to a value larger than 1 (FIG. 3, t1). The amplification gain is derived from or determined based on a map or function indicating the relationship between the operating speed of the accelerator pedal 20 and the amplification gain, which map or function is stored in the storage unit 40 of the ECU 30. To determine the amplification gain according to the operating speed of the accelerator pedal 20, the relationship between the differential value representing the rate of change of the accelerator pedal stroke and the amplification gain is set in advance and stored in the form of a map in the storage unit 40, and the maximum value of differential values is obtained based on accelerator pedal strokes acquired by the accelerator stroke acquiring unit 32, for example. With this arrangement, the amplification gain may be derived or determined based on the maximum value of differential values thus obtained and the above-mentioned map, or a function indicating the relationship between the maximum value of differential values and the amplification gain may be set in advance, and the amplification gain may be calculated according to the function. Thus, the differential value representing the rate of change of the accelerator pedal stroke used for determining quick release or quick depression of the accelerator pedal 20 is used as the operating speed of the accelerator pedal 20.

When the drive system control unit 33 calculates the target acceleration based on which the driving force generated by the drive system 10 is calculated, based on the accelerator pedal stroke acquired by the accelerator stroke acquiring unit 32, the control unit 33 corrects the target acceleration calculated based on the accelerator pedal, stroke, with the amplification gain determined by the control correcting unit 34. To correct the target acceleration with the amplification gain when it is determined that quick depression of the accelerator pedal 20 takes place, the target acceleration is multiplied by the amplification gain, from the time at which the quick depression is determined and the amplification gain is set to a value larger than 1. As a result, the absolute value of the post-correction target acceleration as a target acceleration subjected to correction using the amplification gain increases to be larger than that of the pre-correction target acceleration as a target acceleration that is not corrected. Thus, the target acceleration is amplified or increased when the accelerator pedal 20 is quickly depressed.

If the accelerator pedal 20 starts being released while the target acceleration is corrected by being multiplied by the amplification gain, the amplification gain is gradually reduced according to the accelerator pedal stroke (FIG. 3, t3). In this case, the target acceleration is reduced due to both reduction of the accelerator pedal stroke and reduction of the amplification gain. Namely, the pre-correction target acceleration is gradually reduced according to the accelerator pedal stroke when the accelerator pedal stroke is reduced, whereas the post-correction target acceleration is gradually reduced according to the accelerator pedal stroke, like the pre-correction target acceleration, and is additionally reduced due to reduction of the amplification gain. Therefore, the post-correction target acceleration, whose absolute value is larger than that of the pre-correction target acceleration owing to the amplification gain, is reduced at a larger rate of change than the pre-correction target acceleration, and the difference between the pre-correction target acceleration and the post-correction target acceleration is gradually reduced.

When the accelerator pedal 20 is returned and the accelerator pedal stroke is reduced, the target acceleration is gradually reduced in the manner as described above. If the accelerator pedal 20 is kept in this condition without being depressed, the target acceleration becomes equal to 0, namely, the pre-correction target acceleration becomes equal to 0 (FIG. 3, t5).

The post-correction target acceleration changes at a larger rate of change than the pre-correction target acceleration when the accelerator pedal stroke is reduced, so that the difference between the post-correction target acceleration and the pre-correction target acceleration is reduced, and the magnitude of the post-correction target acceleration becomes equal to 0 at the same time that the pre-correction target acceleration becomes equal to 0. Namely, the amplification gain, by which the target acceleration is multiplied so as to be corrected when the accelerator pedal 20 is quickly depressed, is set to 1 when the target acceleration that changes according to the accelerator pedal stroke becomes substantially equal to 0, thus resuming a condition where the absolute value of the target acceleration is not increased, whereby control of increasing correction executed upon quick depression of the accelerator pedal 20 is stopped (FIG. 3, t5). If the operating speed of the accelerator pedal 20 is high at this time, the target acceleration also changes at a large rate or high speed, and it may be difficult to set the amplification gain to 1 when the target acceleration is precisely equal to 0. In view of this case, the amplification gain is set to 1 when the target acceleration becomes as close to 0 as possible, depending on the calculation speed of the ECU 30 and the detection speed of each detecting device.

Also, where the control of increasing correction is conducted by multiplying the target acceleration by the amplification gain upon determination of quick depression of the accelerator pedal 20 as described above, the amplification gain is gradually changed when the current accelerator pedal stroke becomes smaller than the accelerator pedal stroke at the time of determination of quick depression, or when the accelerator pedal 20 starts being released, and the amplification gain is set to 1 when the accelerator pedal stroke becomes equal to 0, so that the control is stopped. The control for increasing correction of the target acceleration when the accelerator pedal 20 is quickly depressed is also stopped in the case where it is determined that quick release of the accelerator pedal 20 takes place, as well as the above cases.

When it is determined that the operating speed of the accelerator pedal 20 is higher than a given operating speed, the vehicle control system 2 according to the embodiment restricts shifting of the automatic transmission 15. More specifically, when it is determined that the accelerator pedal 20 is quickly depressed or quickly released, the gear position selected when the automatic transmission 15 is shifted down to a lower-speed gear position is limited. In the following, shift control implemented by the vehicle control system 2 of the embodiment when it is determined that quick depression of the accelerator pedal 20 takes place will be described.

Figure 4:
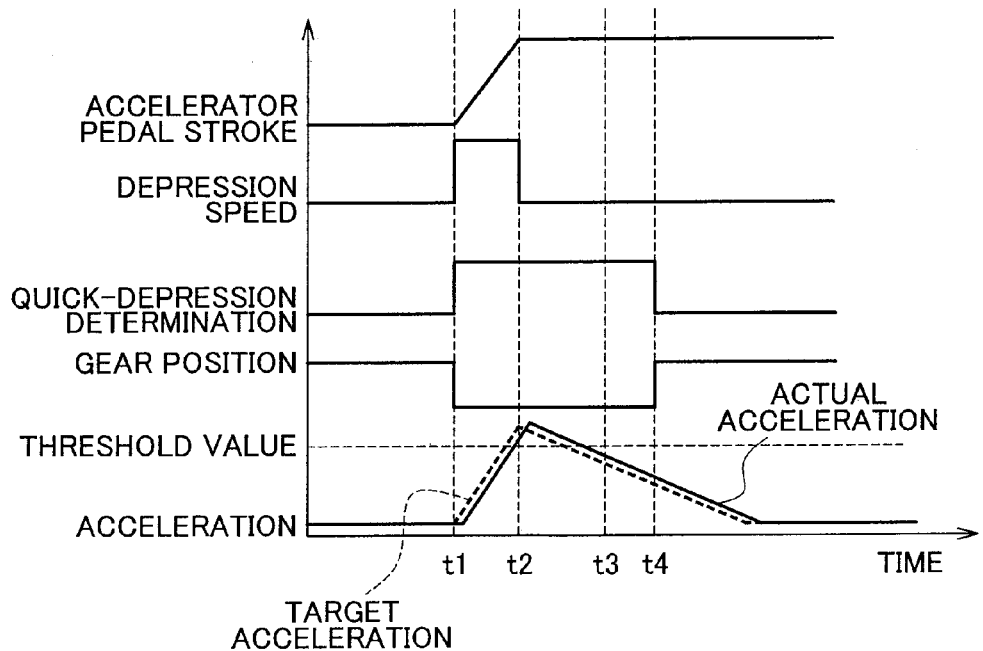
FIG. 4 is an explanatory view showing shifting conditions when the accelerator pedal is quickly depressed.

FIG. 4 is an explanatory view showing shifting conditions when the accelerator pedal is quickly depressed. While the drive system control unit 33 calculates the target acceleration based on the accelerator pedal stroke, the control correcting unit 34 selects a gear position having the smallest reduction ratio, i.e., the highest gear position as the gear position of the highest speed, from two or more gear positions of the automatic transmission 15 that can achieve the target acceleration calculated by the drive system control unit 33, when it is determined that quick depression of the accelerator pedal 20 takes place. Namely, the target acceleration is increased when the accelerator pedal 20 is quickly depressed, and the accelerator pedal stroke is abruptly increased; in this case, the control correcting unit 34 selects the highest gear position that can achieve the target acceleration, from the gear positions of the lower speed than that of the current gear position (FIG. 4, t1).

The target acceleration mentioned herein is the target acceleration that has been corrected with the amplification gain, i.e., the target acceleration obtained by multiplying the same with the amplification gain, when it is determined that quick depression of the accelerator pedal 20 takes place. Namely, the target acceleration means the post-correction target acceleration as indicated in FIG. 3.

The highest gear position selected by the control correcting unit 34 is transmitted to the shift control unit 36 included in the processing unit 31 of the ECU 30, and the shift control unit 36 controls the automatic transmission 15 so as to change the gear position of the automatic transmission 15 to the highest gear position. In this case, the automatic transmission 15 is shifted down to the highest gear position, i.e., a downshift to the highest gear position is conducted, since the gear position of the automatic transmission 15 after shifting is on the lower-speed side of the current gear position. As a result, the target acceleration is achieved, and the actual acceleration applied to the vehicle 1 during running becomes equal to an acceleration whose magnitude varies according to the target acceleration.

When the accelerator pedal 20 is quickly depressed, and the accelerator pedal stroke is abruptly increased, the target acceleration is calculated according to the accelerator pedal stroke in a condition in which the gear position of the automatic transmission 15 is changed to the highest gear position; therefore, the target acceleration increases, and the actual acceleration increases accordingly.

In the example of FIG. 4, after the accelerator pedal 20 is depressed and the amount of depression reaches a given depression amount, the driver keeps the accelerator pedal 20 depressed by the given depression amount. In this case, the accelerator pedal stroke is also kept in a constant condition. When the amount of depression of the accelerator pedal 20 is kept in a constant condition, and the accelerator pedal stroke is also kept in a constant condition, the speed of depression of the accelerator pedal 20 becomes equal to 0 (FIG. 4, t2). In this case, the depression speed becomes lower than the operating speed used when determining whether quick depression of the accelerator pedal 20 takes place. If the depression speed is merely lower than the operating speed based on which quick depression is determined, the automatic transmission 15 is kept in the highest gear position to which the transmission 15 was shifted down.

The control correcting unit 34 performs control of the gear position when the accelerator pedal 20 is quickly depressed, based on a determination whether the operating speed of the accelerator pedal 20 is lower than the operating speed based on which quick depression is determined, and a determination whether the target acceleration is lower than a predetermined threshold value. Namely, the driver's request or demand for acceleration is low when the depression speed of the accelerator pedal 20 is low, and the target acceleration may also be reduced in this case. The control correction unit 34 cancels the above-described control (FIG. 4, t3) when it is determined that the depression speed of the accelerator pedal 20 is lowered and the target acceleration is reduced.

More specifically, when the operating speed of the accelerator pedal 20 is lower than the operating speed based on which quick depression is determined, and the target acceleration is kept smaller than the predetermined threshold value for a period of time equal to or longer than a given period of time, the control executed upon quick depression of the accelerator pedal 20 is cancelled, and the automatic transmission 15 is shifted up to the original gear position, or shifted to a gear position suitable for the vehicle speed.

The above-indicated threshold value of the target acceleration based on which cancellation of the control is determined, and the above-indicated given period of time, are set in advance and stored in the storage unit 40 of the ECU 30. Also, the control for limiting the gear position when the accelerator pedal 20 is quickly depressed may be cancelled when the actual acceleration, rather than the target acceleration, is kept smaller than a predetermined threshold value for a period of time equal to or longer than a given period of time. Also, the same control may be cancelled when the operating speed of the accelerator pedal 20 is lower than the operating speed based on which quick depression is determined, and variations in the vehicle speed within a given period of time are smaller than a given set value.

When it is determined that the operating speed of the accelerator pedal 20 is higher than the given operating speed, the vehicle control system 2 of this embodiment enhances a response characteristic set when determining dynamic characteristics of the target acceleration or target driving force, so that driving force requested by the driver can be quickly achieved. Then, when the vehicle control system 2 controls the drive system 10, it normally makes the response characteristic set when determining dynamic characteristics of the target acceleration relatively slow, so that variations in the driving force generated by the drive system 10 are less likely to be or prevented from being too responsive to subtle movements of the accelerator pedal 20. As a result, the response characteristic of commands issued when controlling the drive system 10 in response to the driver's operation of the accelerator pedal 20 becomes slow or mild; therefore, the driving force changes relatively slowly or gently, and it is possible to reduce or eliminate the difficulty in control of the driving force or prevent hunting, which would occur if variations in the driving force are too responsive to the operation of the accelerator pedal 20.

During normal control of the drive system 10 of the vehicle control system 2, the response characteristic set when determining dynamic characteristics of the target acceleration or target driving force is made relatively slow. However, when the accelerator pedal is quickly depressed or quickly released, the response characteristic is enhanced (i.e., the speed of response is increased), and the speed of change of the driving force responsive to the operation of the accelerator pedal 20 is increased. In the following, control for correcting the response characteristic, which is implemented by the vehicle control system 2 of this embodiment when it is determined that quick depression of the accelerator pedal 20 takes place, will be explained.

Figure 5:
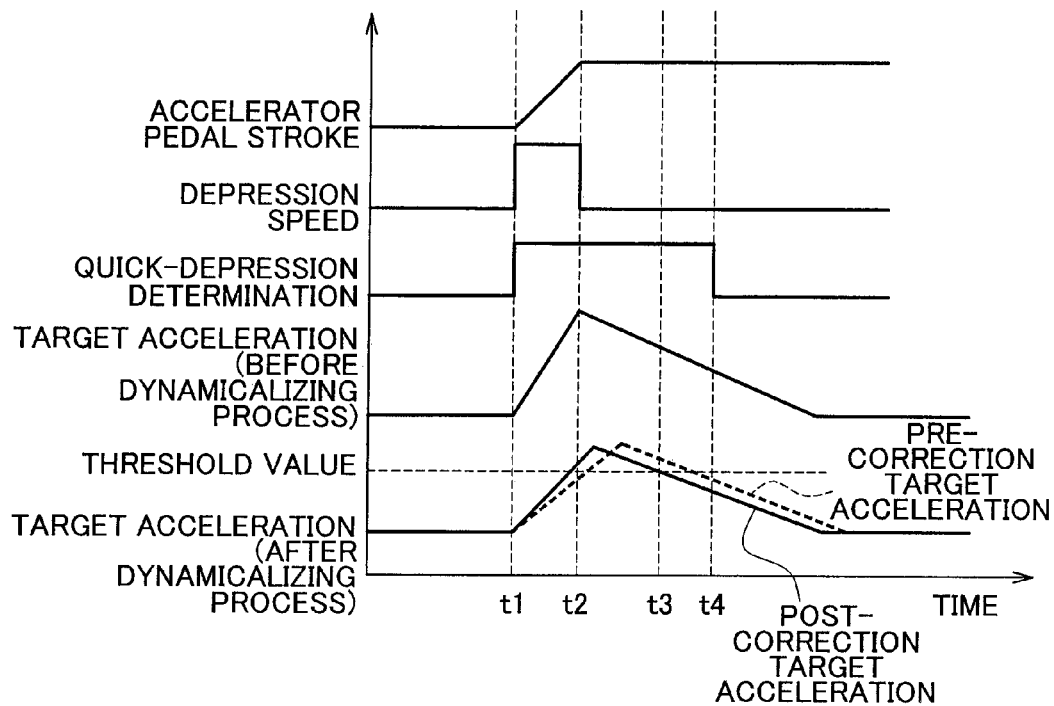
FIG. 5 is an explanatory view showing control for correcting a response characteristic when the accelerator pedal is quickly depressed.

FIG. 5 is an explanatory view showing control for correcting a response characteristic when the accelerator pedal is quickly depressed. When the accelerator pedal 20 is operated, the drive system control unit 33 executes a process of determining dynamic characteristics of the target acceleration calculated based on the accelerator pedal stroke and the vehicle speed (which process will be called "dynamicalizing process"), and controls the drive system 10 based on the target acceleration subjected to the dynamicalizing process. When it is determined that the accelerator pedal 20 is quickly depressed (FIG. 5, t1), the control correcting unit 34 makes a correction on the dynamicalizing process. Namely, the drive system control unit 33, when normally controlling the drive system 10, performs the dynamicalizing process on the target acceleration, so as to reduce the speed or rate of change of the target acceleration in response to change of the accelerator pedal stroke, and controls the drive system 10 based on the target acceleration subjected to the dynamicalizing process, so as to make the response characteristic of the driving force to change of the accelerator pedal stroke relatively slow or mild.

The control correcting unit 34 corrects the dynamicalizing process as a process for reducing the rate or speed of change of the target acceleration in response to change of the accelerator pedal stroke when it is determined that the accelerator pedal 20 is quickly depressed, thereby to correct the target acceleration used when controlling the drive system 10. The control correcting unit 34 corrects the target acceleration through correction of the dynamicalizing process, so as to enhance the response characteristic of the driving force. To enhance the response characteristic of the driving force, the dynamicalizing process is corrected by raising the cut-off frequency of a low-pass filter for use in control of the drive system 10, for example, so as to enhance the response characteristic (i.e., increase the speed of response) to the operation of the accelerator pedal 20.

Since the dynamicalizing process is corrected as described above when it is determined that the accelerator pedal 20 is quickly depressed, the post-correction target acceleration as the target acceleration subjected to the dynamicalizing process and further correction thereof is delayed by a smaller amount relative to the target acceleration, that has not been subjected to the dynamicalizing process, than the pre-correction target acceleration as the target acceleration subjected to the dynamicalizing process but no further correction. In other words, when it is determined that the accelerator pedal 20 is quickly depressed, the dynamicalizing process is corrected, so as to improve the response characteristic to the target acceleration that has not been subjected to the dynamicalizing process. The pre-correction target acceleration mentioned herein is the target acceleration (post-correction target acceleration as indicated in FIG. 3) obtained by multiplying the target acceleration calculated based on the stroke of the accelerator pedal 20 by an amplification gain for correction thereof, like the target acceleration used in shift control (FIG. 4) executed upon quick depression of the accelerator pedal 20.

When it is determined that the accelerator pedal 20 is quickly depressed, the target acceleration is corrected through correction of the dynamicalizing process as described above, and the target acceleration subjected to the dynamicalizing process is made closer to the target acceleration that has not been subjected to the dynamicalizing process, so as to enhance the response characteristic of the acceleration, or driving force, to the operation of the accelerator pedal 20.

The above-described control under which the target acceleration is corrected through correction of the dynamicalizing process on the target acceleration when it is determined that the accelerator pedal 20 is quickly depressed is cancelled (FIG. 5, t4) when the operating speed of the accelerator pedal 20 is lower than the operating speed based on which quick depression is determined, and the post-correction target acceleration is kept smaller than a predetermined threshold value for a period of time equal to or longer than a given period of time, as is the case with shift control executed upon quick depression of the accelerator pedal 20. The control for enhancing the response characteristic when quick depression or quick release of the accelerator pedal 20 is determined is also controlled when the accelerator pedal 20 is placed in the fully released position.

The control for enhancing the response characteristic when quick depression of the accelerator pedal 20 is determined may be cancelled when the actual acceleration, rather than the target acceleration, is kept smaller than a predetermined threshold value for a period of time equal to or longer than a given period of time, as is the case with shift control executed when quick depression of the accelerator pedal 20 is determined. Also, the same control may be cancelled when the operating speed of the accelerator pedal 20 is lower than the operating speed based on which quick depression or quick release is determined, and variations in the vehicle speed within a given period of time are smaller than a given set value.

When the accelerator pedal 20 is quickly depressed, the target acceleration is corrected (i.e., increased) with the amplification gain, as described above, so that the absolute value of the target acceleration is increased. To increase the absolute value of the target acceleration upon quick depression of the accelerator pedal 20, the torque of the engine 12 is increased by advancing the ignition timing of the engine 12, and/or increasing the amount of fuel injected into the engine 12. It is also to be noted that various accessories are used in the engine 12. To increase the absolute value of the target acceleration, one or more accessories having an influence on variations in driving force when power generated by the engine 12 is used as driving force may be controlled as needed, so as to control the acceleration.

Figure 6:
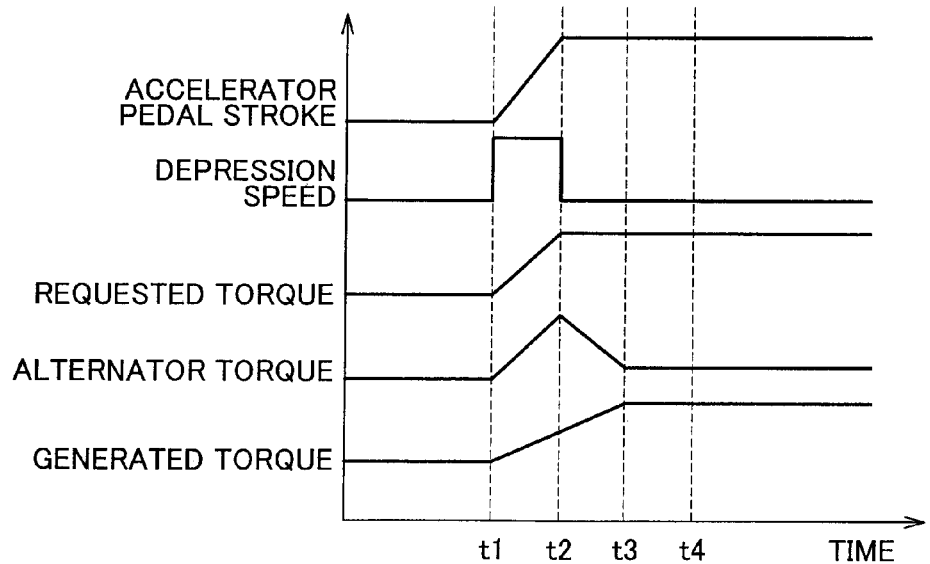
FIG. 6 is an explanatory view showing control for adjusting alternator torque when the accelerator pedal is quickly depressed.

FIG. 6 is an explanatory view showing alternator torque control executed when the accelerator pedal is quickly depressed. For example, the engine 12 is provided with an alternator (not shown) as an accessory capable of generating electric power for use in various electric components included in the vehicle 1, using torque generated by the engine 12. When the accelerator pedal 20 is quickly depressed, the alternator is controlled so as to adjust the acceleration. Namely, when the alternator generates electric power, using torque generated by the engine 12, it consumes a part of the power generated by the engine 12. Therefore, if the amount of electric power generated by the alternator is reduced, a portion of the torque of the engine 12 used for operating the alternator will be used as driving force, and the torque transmitted from the engine 12 to the driving wheels will be increased accordingly.

Thus, the alternator torque, i.e., torque that changes as the amount of electric power generated by the alternator is adjusted, changes at a higher speed than the speed of change of power generated by the engine when the power is adjusted. Therefore, when it is determined that the accelerator pedal 20 is quickly depressed, the response of the driving force is improved by using the alternator torque.

More specifically, when the accelerator pedal 20 is depressed at a depression speed that is higher than a given operating speed, and it is thus determined that quick depression of the accelerator pedal 20 takes place (FIG. 6, t1), the speed or rate of increase of driver-requested torque also increases, as shown in FIG. 6; in this case, the torque generated by the engine 12 is increased, and the alternator torque is also increased. As a result, generated torque that is actually generated or transmitted toward the driving wheels rises quickly, namely, increases immediately after the accelerator pedal 20 is depressed. Then, when the torque generated by the engine 12 has increased to a certain point, the alternator torque is reduced (FIG. 6, t2) so that the torque generated by the engine 12 provides the driver-requested torque.

Thus, when the target driving force can be accomplished solely by the engine 12, the alternator torque used for torque correction is gradually changed in coordination with the torque of the engine 12, so as not to cause variations in torque, and the alternator is operated so as to generate an appropriate amount of electric power. When it is determined that the accelerator pedal 20 is quickly depressed, control for coordination between the torque generated by the engine 12 and the alternator torque is carried out as needed.

Figure 7:
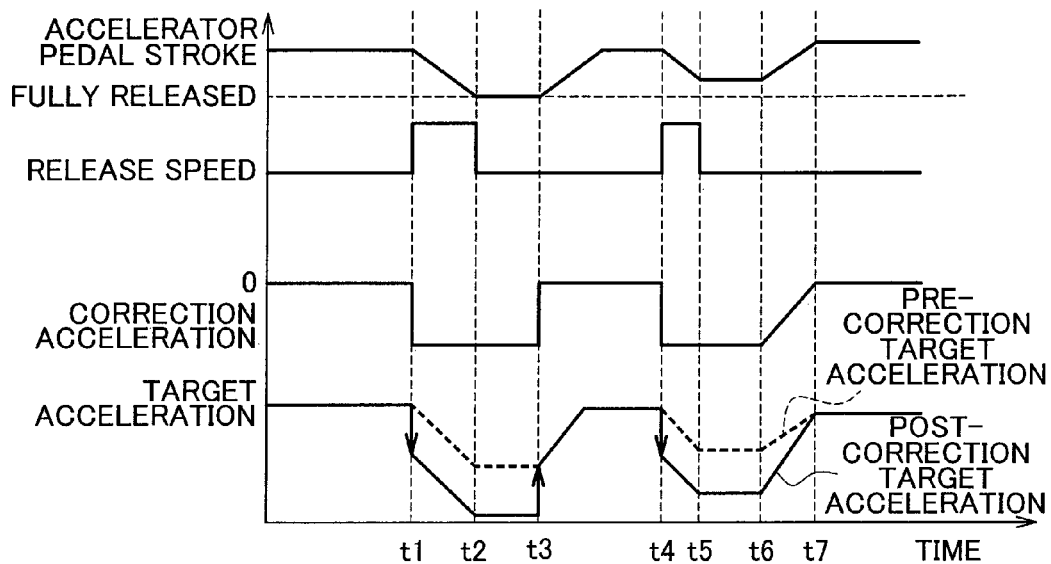
FIG. 7 is an explanatory view showing changes in the target acceleration when the accelerator pedal is quickly released.

FIG. 7 is an explanatory view showing changes in the target acceleration when the accelerator pedal is quickly released. While the above-described control operations are performed when the accelerator pedal 20 is quickly depressed, the following control is performed when the accelerator pedal 20 is quickly released, as one example of control executed when the operating speed of the accelerator pedal 20 is higher than a given operating speed. If the accelerator pedal 20 is released to the fully released position in a stroke during running of the vehicle 1, the accelerator pedal 20 operates in a direction to close the throttle valve at a large release speed. The control correcting unit 34 determines whether quick release of the accelerator pedal 20 takes place, by comparing the speed or rate of change of the accelerator pedal stroke acquired by the accelerator stroke acquiring unit 32 when the accelerator pedal 20 is released, with a given operating speed stored in the storage unit 40 of the ECU 30, based on which it is determined whether quick release of the accelerator pedal 20 takes place. Namely, when the control correcting unit 34 determines that a quick-release determination value as the speed of release of the accelerator pedal 20 acquired by the accelerator stroke acquiring unit 32 is higher than the given operating speed stored in the storage unit 40, it determines that quick release of the accelerator pedal 20 takes place (FIG. 7, t1).

If it is determined that quick release of the accelerator pedal 20 takes place, the control correcting unit 34 determines a correction acceleration as a correction amount of the target acceleration (FIG. 7, t1). Namely, the control correcting unit 34 determines a correction acceleration as an offset amount of the target acceleration used when the absolute value of the target acceleration is increased, based on the operating speed of the accelerator pedal 20, and the vehicle speed, or the like.

Since the correction acceleration is an offset amount of the target acceleration used when the absolute value of the target acceleration is increased, the correction acceleration used when the accelerator pedal 20 is depressed so that the target acceleration is increased assumes a positive value by which the target acceleration is increased. To the contrary, the correction acceleration used when the accelerator pedal 20 that has been depressed is returned so that the target acceleration is reduced assumes a negative value by which the target acceleration is reduced. Therefore, the sign of the correction acceleration when it is determined that quick release of the accelerator pedal 20 takes place as shown in FIG. 7, for example, is negative irrespective of the sign of the current target acceleration, and the target acceleration is reduced by a value represented by the correction acceleration. In other words, where the target acceleration whose value is reduced when the accelerator pedal 20 is returned is referred to as a target deceleration, and the correction acceleration that increases the target deceleration is referred to as a correction deceleration, the sign of the correction deceleration that increases the target deceleration when the accelerator pedal 20 is returned is positive.

In this connection, the correction acceleration may be set to a fixed value in advance and stored in the storage unit 40, or may be changed in accordance with the operating speed of the accelerator pedal 20 as described above. In the case where the correction acceleration is changed according to the operating speed, etc., the relationship between the operating speed of the accelerator pedal 20 and the vehicle speed, or the like, and the correction acceleration may be set in advance and stored in the form of a map in the storage unit 40, and the correction acceleration may be derived or determined based on the operating speed of the accelerator pedal 20 at the time of determination of quick release, etc., and this map, or a function indicating the relationship between the operating speed and the vehicle speed, or the like, and the correction acceleration may be set in advance, and the correction acceleration may be calculated according to this function.

While the drive system control unit 33 calculates the target acceleration based on which the driving force generated by the drive system 10 is calculated, based on the accelerator pedal stroke acquired by the accelerator stroke acquiring unit 32, the target acceleration is corrected by adding the correction acceleration determined by the control correcting unit 34 to the target acceleration thus calculated, so that the target acceleration shifts in a direction to increase the absolute value thereof (FIG. 7, t1). The target acceleration is corrected or shifted with the correction acceleration, immediately after the control correcting unit 34 determines that quick release of the accelerator pedal 20 takes place.

Namely, the drive system control unit 33 calculates a target acceleration based on the accelerator pedal stroke acquired by the accelerator stroke acquiring unit 32, as a pre-correction target acceleration that has not been subjected, to correction at the control correcting unit 34, and adds a correction acceleration to the pre-correction target acceleration. In this manner, the pre-correction target acceleration is shifted, i.e., its absolute value is increased by the amount of the correction acceleration, so that a post-correction target acceleration as a target acceleration subjected to correction is calculated. In other words, the target deceleration is increased by the correction deceleration when the accelerator pedal 20 is quickly released.

When the accelerator pedal 20 is quickly released, the target acceleration is corrected in the manner as described above. If the accelerator pedal 20 is released to the fully released position, the accelerator pedal 20 is kept in the fully released position, and therefore, the release speed of the accelerator pedal 20 becomes equal to 0 (FIG. 7, t2). In this case, the release speed is lower than the operating speed based on which it is determined whether quick release of the accelerator pedal 20 takes place, but the correction acceleration continues to be added to the pre-correction target acceleration, and the target acceleration continues to be corrected, until the accelerator pedal 20 is depressed again.

When the accelerator pedal 20 is depressed and the accelerator pedal stroke increases again, in a condition where the accelerator pedal 20 is placed in the fully released position after quick release, and the target acceleration is being corrected, the above-described control executed upon quick release of the accelerator pedal is cancelled. Namely, the correction acceleration is made equal to 0 at the moment at which the accelerator pedal 20 is depressed again from the fully released position after it is quickly released, so as to stop increasing correction to increase the absolute value of the target acceleration (FIG. 7, t3). As a result, the target acceleration ceases to be corrected; therefore, the post-correction target acceleration becomes equal to the pre-correction target acceleration, and the target acceleration is determined according to the accelerator pedal stroke.

In this case, the accelerator pedal stroke is increased as the accelerator pedal 20 is depressed, and therefore, the target acceleration calculated based on the accelerator pedal stroke increases up to a magnitude commensurate with the magnitude of the accelerator pedal stroke.

Even when the accelerator pedal 20, which is in a depressed state with the accelerator pedal stroke being equal to a certain magnitude, is released to a point ahead of the fully released position, the correction acceleration is determined in substantially the same manner as in the case where the accelerator pedal 20 is fully released, if the release speed is higher than the operating speed based on which it is determined that the accelerator pedal 20 is quickly released. In this case, too, the target acceleration is shifted by an amount corresponding to the correction acceleration, so that the absolute value of the target acceleration is increased (FIG. 7, t4).

When the accelerator pedal 20 is depressed after it is returned to the point ahead of the fully released position, the post-correction target acceleration is gradually increased (FIG. 7, t6), unlike the case where the accelerator pedal 20 is depressed from a condition where it is in the fully released position. More specifically, when the accelerator pedal 20 is depressed again after it is quickly released without reaching the fully released position, the post-correction target acceleration is gradually increased to 0, so that it becomes equal to 0 at the same time that the pre-correction target acceleration would become equal to 0.

For example, the accelerator pedal stroke at the time of re-depression of the accelerator pedal 20 is set in advance to 10%. When the accelerator pedal stroke reaches the set stroke during re-depression, the post-correction target acceleration is increased according to the accelerator pedal stroke, and the correction acceleration whose sign is negative is gradually increased, so that the absolute value of the correction acceleration is gradually reduced to be close to 0, and the correction amount of the post-correction target acceleration is reduced (FIG. 7, t6). Thus, the post-correction target acceleration, which has been smaller than 0, gradually changes until the target acceleration becomes equal to 0.

When the accelerator pedal 20 is depressed again after it is quickly released without reaching the fully released position, the control executed upon quick release of the accelerator pedal 20 is cancelled and the correction acceleration is made equal to 0 (FIG. 7, t7), at the moment at which the gradually increasing, post-correction target acceleration reaches 0. If the correction acceleration is made equal to 0, the target acceleration is not corrected any longer, and therefore, the target acceleration is calculated according to the accelerator pedal stroke.

The correction to increase the target acceleration when the accelerator pedal 20 is quickly released to the fully released position may also be stopped under substantially the same control as that performed when the accelerator pedal 20 is quickly released without reaching the fully released position. Namely, even in the case where the accelerator pedal 20 is quickly released to the fully released position, the correction acceleration may be gradually changed, so that the post-correction target acceleration, which has been smaller than 0, is gradually changed until it becomes equal to 0, and the control executed upon quick release may be cancelled when the target acceleration becomes equal to 0. The correction to increase the target acceleration when the accelerator pedal 20 is quickly released to the fully released position is also can-celled when it is determined to execute other control regarding the operation of the accelerator pedal 20, or the acceleration of the vehicle 1, such as when it is determined that the accelerator pedal 20 is quickly depressed. Thus, the correction to increase the target acceleration is stopped depending on the manner of operating the accelerator pedal 20.

When it is determined that quick release of the accelerator pedal 20 takes place, the gear position of the automatic transmission 15 is changed to the highest gear position, as in the case where it is determined that the accelerator pedal 20 is quickly depressed. Namely, the release of the accelerator pedal 20 indicates the presence of the driver's intention to decelerate the vehicle, and the quick release of the accelerator pedal 20 is likely to indicate that the driver requests a large deceleration. In this case, therefore, the requested deceleration is set as a target acceleration, and the highest gear position as the highest-speed gear position is selected from the gear positions in which the target acceleration can be achieved, so that the automatic transmission 15 is shifted down to the highest gear position.

The downshift to the highest gear position upon quick release of the accelerator pedal 20 is carried out after the accelerator pedal 20 is returned to the fully released position. Namely, when the accelerator pedal 20 is not in the fully released position but is in a depressed state, no downshift is carried out even when it is determined that the accelerator pedal 20 is quickly released, and upshift is also inhibited; thus, the automatic transmission 15 is shifted to the highest gear position after the accelerator pedal 20 is returned to the fully released position.

When the accelerator pedal 20 is quickly released, the target acceleration is shifted by an offset amount to be corrected, so that the absolute value of the target acceleration is increased, as described above. To increase the absolute value of the target acceleration upon quick release of the accelerator pedal 20, the torque of the engine 12 is reduced by retarding the ignition timing of the engine 12, or reducing the amount of fuel injected into the engine. Furthermore, when the accelerator pedal 20 is quickly released, control for advancing the fuel-cut timing during deceleration to be earlier than that during normal deceleration is performed so that the deceleration is increased at an earlier time.

Figure 8:
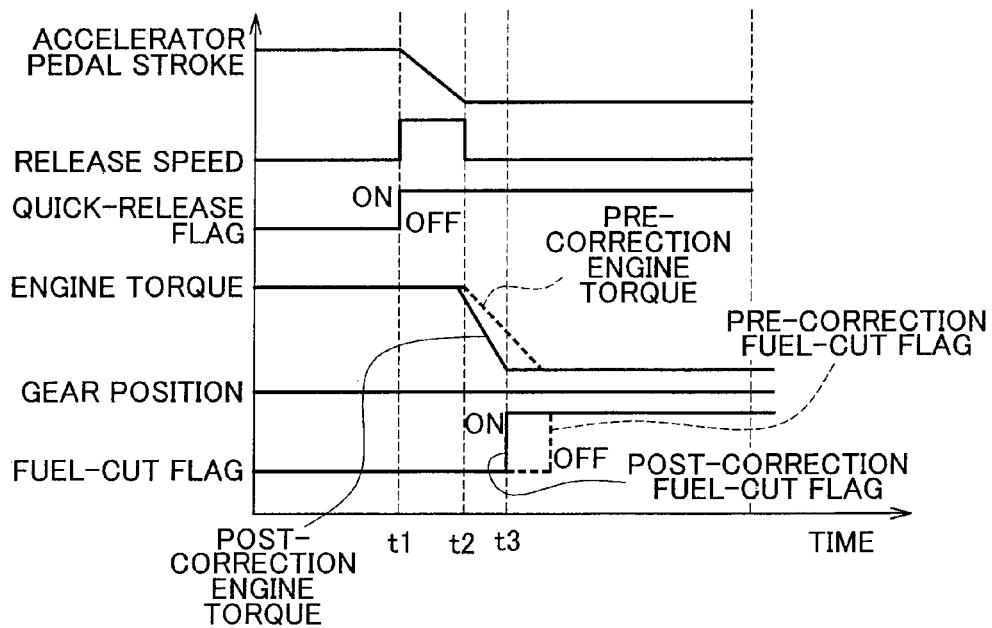
FIG. 8 is an explanatory view showing fuel-cut conditions when the accelerator pedal is quickly released.

FIG. 8 is an explanatory view showing fuel-cut conditions when the accelerator pedal is quickly released. When the accelerator pedal 20 is returned, the engine control unit 35 controls the engine 12 so as to reduce engine torque according to the accelerator pedal stroke. When the accelerator pedal 20 is quickly released, the engine torque is reduced at an increased rate or within a shorter time. More specifically, as shown in FIG. 8, when the release speed of the accelerator pedal 20, while it is being returned from a depressed state, is equal to or higher than a given operating speed, the control correcting unit 34 determines that the accelerator pedal 20 is quickly released, and switches a quick-release flag to the ON state (FIG. 8, t1).

The quick-release flag is stored in the storage unit 40 of the ECU 30, as a flag that indicates whether quick release of the accelerator pedal 20 takes place. The control correcting unit 34 switches the quick-release flag to ON when it is determined that quick release of the accelerator pedal 20 takes place, and switches the quick-release flag to OFF when it is determined that no quick release of the accelerator pedal 20 takes place.

If the quick-release flag is switched to ON, the engine control unit 35 controls the ignition timing of the engine 12, so as to correct the ignition timing by retarding the same as compared with the case where the quick-release flag is OFF (FIG. 8, t2). Since the torque of the engine 12 is reduced when the ignition timing is retarded, post-correction engine torque as engine torque after correction of the ignition timing is reduced at a higher speed or rate than engine torque prior to correction of the ignition timing, i.e., pre-correction engine torque as engine torque obtained when the ignition timing is not corrected.

To reduce the power generated by the engine 12 as the accelerator pedal stroke decreases, fuel cut control as control for stopping supply of fuel is performed when certain conditions, such as a condition that the engine torque is equal to or smaller than a given magnitude, are satisfied. When the engine torque is reduced at an increased rate or within a short time through retarding correction of the ignition timing, the fuel cut timing is also advanced. While the fuel cut control is executed when a fuel-cut flag as a flag indicative of whether the conditions for execution of fuel cut control are satisfied is ON, the fuel-cut flag is switched from OFF to ON when the engine torque becomes equal to or smaller than a given magnitude.

Since the speed or rate of reduction of the post-correction engine torque is higher than that of the pre-correction engine torque, the fuel-cut flag, which is switched from OFF to ON when the engine torque becomes equal to or smaller than the given magnitude, is switched to ON at different points in time depending on conditions of correction of the ignition timing. Namely, the post-correction fuel-cut flag as a fuel-cut flag in the case where the ignition timing is corrected to be retarded is switched from OFF to ON when the post-correction engine torque becomes equal to or smaller than the given magnitude; therefore, the post-correction fuel-cut flag is switched from OFF to ON at an earlier point in time than the pre-correction fuel-cut flag as a fuel-cut flag in the case where the ignition timing is not corrected to be regarded (FIG. 8, t3).

When it is determined that the accelerator pedal 20 is quickly released, the ignition timing of the engine 12 is corrected to be retarded as compared with that during normal operation, so that the engine torque is reduced at an increased speed or rate under the control of reducing the ignition timing before fuel cut control is performed; therefore, the fuel-cut flag is switched to ON at an earlier point in time than that of the case of normal ignition timing. As a result, the fuel cut timing during deceleration in the case where it is determined that the accelerator pedal 20 is quickly released is earlier than the fuel cut timing during deceleration in the case where it is not determined that the accelerator pedal 20 is quickly released. Accordingly, the deceleration as an acceleration measured in a direction in which the vehicle is decelerated is increased at an earlier time.

Also, when it is determined that the accelerator pedal 20 is quickly released, the process of determining dynamic characteristics of the target acceleration (or "dynamicalizing process") is corrected, in substantially the same manner as in the case where it is determined that the accelerator pedal 20 is quickly depressed, thus improving a response characteristic to the target acceleration that has not been subjected to the dynamicalizing process (see FIG. 5).

When the operating speed of the accelerator pedal 20 is higher than the given operating speed, such as when the accelerator pedal 20 is quickly depressed, the vehicle control system 2 according to the illustrated embodiment increases the absolute value of the target acceleration by multiplying the target acceleration by the amplification gain; therefore, when the driver requests a large acceleration, the requested acceleration can be achieved. Also, the amplification gain by which the target acceleration is multiplied is set to 1 when the target acceleration becomes equal to 0, so as to cancel the control for correcting the target acceleration, thus resuming a condition where the absolute value of the target acceleration is not increased. Thus, the requested acceleration can be achieved when the requested acceleration is large and the operating speed of the accelerator pedal 20 is high, and the control for increasing the target acceleration with the amplification gain is cancelled when the target acceleration becomes equal to 0, so that an elevation change in the actual acceleration is less likely to occur or prevented from occurring when the control for increasing the absolute value of the target acceleration with the amplification gain is stopped. Consequently, the vehicle control system 2 makes the driver less likely or unlikely to feel uncomfortable during driving of the vehicle 1, while achieving a desired acceleration.

When the target acceleration is around 0, the amplification gain by which the target acceleration is multiplied for running control of the vehicle 1 is returned to a condition (i.e., 1) where the absolute value of the target acceleration is not increased; therefore, the control involving multiplication with the amplification gain can be canceled in accordance with the timing of change of the target acceleration, such as when the direction of the acceleration changes. Thus, when the control for increasing the absolute value of the target acceleration with the amplification gain is stopped, an elevation change in the acceleration is less likely to occur or prevented from occurring. Consequently, the vehicle control system 2 makes the driver less likely or unlikely to feel uncomfortable during driving of the vehicle 1, while achieving a desired acceleration.

Since the control involving multiplication with the amplification gain is cancelled when the target acceleration is around 0, the accelerator pedal stroke during steady-state running can be constantly held at a fixed value. Consequently, the driveability is improved during running of the vehicle 1.

When the operating speed of the accelerator pedal 20 is higher than the given operating speed, an increasing correction as a correction to increase the absolute value of the target acceleration by multiplying the target acceleration by the amplification gain is conducted, so that the target acceleration can be easily corrected. This makes it easier for the vehicle control system 2 to make the driver less likely or unlikely to feel uncomfortable during driving of the vehicle 1, while achieving a desired acceleration.

While the increasing correction to increase the absolute value of the target acceleration is conducted when the operating speed of the accelerator pedal 20 is higher than the given operating speed, such as when the accelerator pedal 20 is quickly released, the increasing correction is cancelled in accordance with the manner of operating the accelerator pedal 20. Namely, when the correction to increase the target acceleration is cancelled at the time when the operating state of the accelerator pedal 20 is changed according to the intention of the driver, for example, the increasing correction is stopped at the same time that the target acceleration is changed; therefore, the increasing correction can be cancelled without causing an elevation change in the acceleration. Consequently, the vehicle drive system 2 makes the driver less likely or unlikely to feel uncomfortable during driving of the vehicle, while achieving a desired acceleration.

In the case where the correction to increase the target acceleration is conducted upon quick release of the accelerator pedal 20, the increasing correction is cancelled when the driver stops operating the accelerator pedal in the middle of the operation. Therefore, the correction to increase the target acceleration can be more reliably cancelled when the operating state of the accelerator pedal 20 is changed according to the intention of the driver. Thus, the cancellation of the correction to increase the target acceleration takes place at the same time that the target acceleration changes based on the operation of the accelerator pedal 20; therefore, the increasing correction can be cancelled with increased reliability, without causing an elevation change in the acceleration. Consequently, the vehicle drive system 2 makes the driver less likely or unlikely to feel uncomfortable during driving of the vehicle, while achieving a desired acceleration.

If the accelerator pedal 20 is returned to the fully released position when the correction to increase the target acceleration is conducted upon quick release of the accelerator pedal 20, the increasing correction is cancelled at the time when the accelerator pedal 20 is depressed again; thus, the correction to increase the target acceleration can be cancelled when the target acceleration is apparently switched or changed due to an operation on the accelerator pedal. It is thus possible to cancel the correction to increase the target acceleration, without causing an elevation change to occur in the acceleration during acceleration of the vehicle. Consequently, the vehicle control system 2 makes the driver less likely or unlikely to feel uncomfortable during driving of the vehicle, while achieving a desired acceleration.

When the correction to increase the absolute value of the target acceleration is implemented by shifting the target acceleration by an offset amount represented by the above-mentioned correction acceleration, the response is improved when the increasing correction is conducted. Namely, if the target acceleration is corrected using a gain, it is corrected in the same direction as that represented by the sign of the target acceleration. For example, the target acceleration is corrected only in the direction of acceleration during acceleration of the vehicle, and is corrected only in the direction of deceleration during deceleration. If the target acceleration is corrected using an offset amount (correction acceleration), it can be corrected in the direction of the opposite sign. Namely, when the sign of the target acceleration is positive, the target acceleration may be corrected to be negative in sign, by setting the correction acceleration to a negative value, and shifting the target acceleration in a decreasing direction, using the correction acceleration. In this manner, the target acceleration can be quickly corrected, irrespective of the relationship between the direction of the current acceleration and the sign of the target acceleration. It is thus possible to improve the response when a desired acceleration is generated.

When it is determined that the accelerator pedal 20 is quickly released, the fuel cut control is executed at an earlier point in time than that executed during normal deceleration. If the fuel cut control is executed at an earlier time, the deceleration is increased more quickly or abruptly than that during normal deceleration, which may result in an increase of shock upon deceleration. When the driver quickly releases the accelerator pedal 20, however, the response is often prioritized over prevention of shock. Accordingly, when it is determined that quick release of the accelerator pedal 20 takes place, control for advancing the timing of execution of the fuel cut control is performed, so that the vehicle is decelerated with a higher priority given to the response than to prevention of shock during running of the vehicle 1. Also, advancing the timing of execution of the fuel cut control leads to a reduction in the amount of fuel consumption. Consequently, it is possible to appropriately improve the response during deceleration, while improving the fuel efficiency.

When the accelerator pedal 20 is quickly depressed or quickly released, the driver may wish a different response to the pedal operation than that provided when the accelerator pedal is normally operated. The vehicle control system 2 according to this embodiment controls the drive system 10 with an enhanced response to the operation of the accelerator pedal 20, when the operating speed of the accelerator pedal 20 is higher than the given operating speed. As a result, the driving force changes with an enhanced response to the operation of the accelerator pedal 20 when it is quickly depressed or quickly released. Consequently, a desired acceleration can be generated with the response set in accordance with the intention of the driver.

While the vehicle control system 2 according to this embodiment immediately makes a correction to increase the target acceleration when it is determined that the accelerator pedal 20 is quickly depressed or quickly released, the increasing correction may be started based on a condition of the target acceleration.

Figure 9:
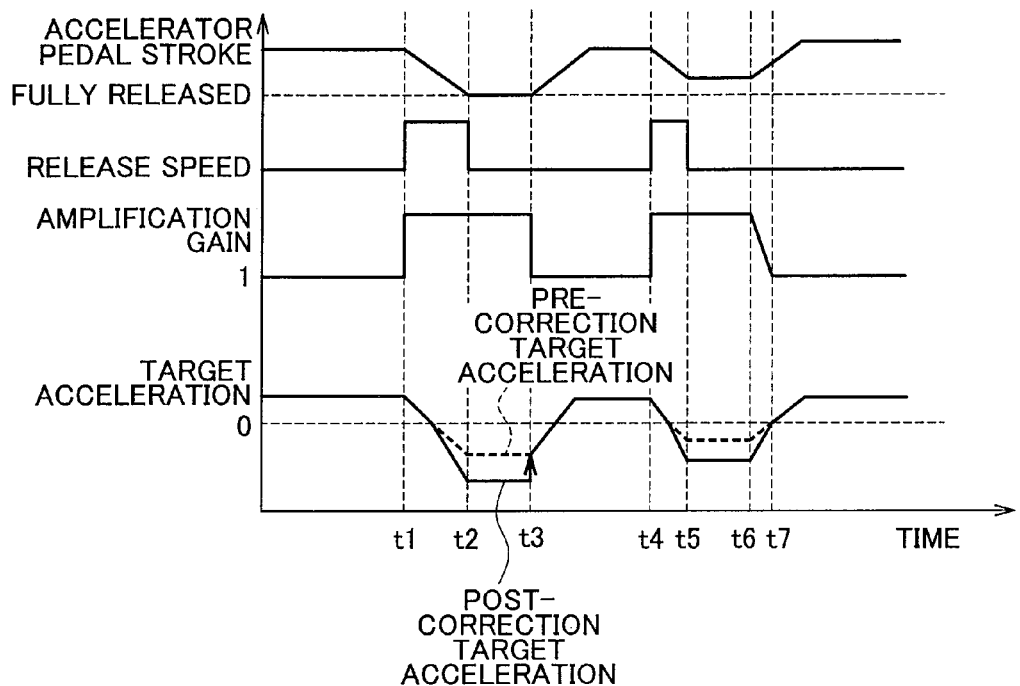
FIG. 9 is an explanatory view illustrating the case where correction is started based on a condition of the target acceleration.

FIG. 9 is an explanatory view illustrating the case where correction is started based on a condition of the target acceleration. As one example of the case where the correction to increase the target acceleration is started based on a condition of the target acceleration when the accelerator pedal 20 is quickly depressed or quickly released, control executed upon quick release of the accelerator pedal 20 will be explained. When the accelerator pedal 20 is operated at a large release speed in a direction to close the throttle valve, the control correcting unit 34 determines that quick release of the accelerator pedal 20 takes place, based on the speed or rate of change of the accelerator pedal stroke acquired by the accelerator stroke acquiring unit 32 (FIG. 9, t1), in the same manner as in the vehicle control system 2 of the illustrated embodiment.

If it is determined that the accelerator pedal 20 is quickly released, the control correcting unit 34 sets an amplification gain as a gain used when increasing the target acceleration, to a value larger than 1 (FIG. 9, t1). The amplification gain may be set to a fixed value in advance and stored in the storage unit 40 of the ECU 30, or may be changed according to the operating speed of the accelerator pedal 20. When the amplification gain is changed according to the operating speed, the amplification gain corresponding to the operating speed of the accelerator pedal 20 is derived or determined, using a map, a function, or the like, that is set in advance and stored in the storage unit 40 of the ECU 30, in the same manner as in the case where the amplification gain is determined when quick depression of the accelerator pedal 20 is determined.

When the drive system control unit 33 calculates the target acceleration based on which the driving force generated by the drive system 10 is calculated, based on the accelerator pedal stroke acquired by the accelerator stroke acquiring unit 32, the control unit 33 corrects the target acceleration thus calculated based on the accelerator pedal stroke, with the amplification gain determined by the control correcting unit 34. When the target acceleration is corrected with the amplification gain, the drive system control unit 33 executes the correction when the target acceleration becomes smaller than 0 km/s$^2$, unlike the case where the target acceleration is corrected in the vehicle control system 2 according to the illustrated embodiment.

When the accelerator pedal 20 is released from a condition where the accelerator pedal 20 is depressed and the vehicle is accelerated, the target acceleration is gradually reduced, and becomes smaller than 0 km/s$^2$ so that a deceleration appears upon reversal of the sign of the target acceleration from positive to negative. When the target acceleration is corrected upon quick release of the accelerator pedal 20, the target acceleration is multiplied by the amplification gain after the sign of the target acceleration is reversed.

As a result, the absolute value of the post-correction target acceleration as the target acceleration subjected to correction with the amplification gain becomes larger than that of the pre-correction target acceleration as the target acceleration that is not subjected to correction, after the target acceleration becomes smaller than 0 km/s², namely, after the sign of the target acceleration becomes negative. Thus, the target acceleration is corrected after a deceleration is generated. In other words, when the accelerator pedal 20 is quickly released, a target deceleration to be achieved when the vehicle is decelerated is amplified by the amplification gain.

The correction of the target acceleration with the amplification gain when the accelerator pedal 20 is quickly released is continued, i.e., the target acceleration continues to be multiplied by the amplification gain, until the accelerator pedal 20 is depressed again, as in the case where the target acceleration is corrected when quick release of the accelerator pedal 20 is determined in the vehicle control system 2 of the illustrated embodiment. The correction of the target acceleration in this condition, or control executed upon quick release, is cancelled by setting the amplification gain by which the target acceleration is multiplied, to 1, when the accelerator pedal 20 is depressed and the accelerator pedal stroke is increased again (FIG. 9, t3). As a result, the target acceleration is not corrected any longer; therefore, the post-correction target acceleration becomes equal to the pre-correction target acceleration, and the target acceleration becomes equal to a value corresponding to the accelerator pedal stroke.

In this condition where the accelerator pedal stroke increases as the accelerator pedal 20 is depressed, the target acceleration calculated based on the accelerator pedal stroke is also increased. Namely, the target acceleration, which has been a negative value representing an acceleration as seen in the direction of deceleration, is increased to be a positive value representing an acceleration as seen in the direction of acceleration, via reversal of the sign from negative to positive. The target acceleration then increases to a magnitude that matches the magnitude of the accelerator pedal stroke.

When the release speed at which the accelerator pedal 20 is released to a point ahead of the fully released position is higher than the operating speed based on which it is determined that the accelerator pedal 20 is quickly released, the amplification gain of the target acceleration is set to a value larger than 1 in substantially the same manner (FIG. 9, t4). In this case, too, the target acceleration is multiplied by the amplification gain after the sign of the target acceleration is reversed from positive to negative, in the same manner as in the case where the accelerator pedal 20 is released to the fully released position. As a result, the absolute value of the post-correction target acceleration becomes larger than that of the pre-correction target acceleration after the target acceleration becomes smaller than 0 km/s², and the target deceleration is amplified.

When the accelerator pedal 20 is depressed again after the partial release as described above, the post-correction target acceleration is gradually increased so that it becomes equal to 0 at the same time that the pre-correction target acceleration becomes equal to 0, in substantially the same manner as in the case where the target acceleration is corrected with the correction acceleration when it is determined that the accelerator pedal 20 is quickly released in the vehicle control system 2 of the illustrated embodiment.

Namely, the accelerator pedal stroke at the time of re-depression of the accelerator pedal 20 is set in advance to 10%, for example, and the post-correction target acceleration is increased according to the accelerator pedal stroke when the accelerator pedal stroke upon re-depression becomes equal to the set value. Furthermore, the amplification gain is gradually reduced so as to reduce the amount of correction of the post-correction target acceleration. As a result, the post-correction target acceleration is gradually changed from a condition where it is smaller than 0, until the target acceleration becomes equal to 0.

When the accelerator pedal is depressed again after it is quickly released without reaching the fully released position, the control executed upon quick release of the accelerator pedal 20 is cancelled and the amplification gain is set to 1, at the moment at which the post-correction target acceleration, which has gradually increased in the above manner, reaches 0, and the correction to increase the target acceleration is stopped (FIG. 9, t7). Since the correction of the target acceleration is terminated when the amplification gain is set to 1, the target acceleration is calculated according to the accelerator pedal stroke.

The correction to increase the target acceleration when the accelerator pedal 20 is quickly released to the fully released position may also be stopped under substantially the same control as that performed when the accelerator pedal 20 is quickly released without reaching the fully released position. Namely, even in the case where the accelerator pedal 20 is quickly released to the fully released position, the amplification gain may be gradually reduced so that the post-correction target acceleration, which has been smaller than 0, is gradually changed until it becomes equal to 0, and the control executed upon quick release may be cancelled when the target acceleration becomes equal to 0. The correction to increase the target acceleration when the accelerator pedal 20 is quickly released to the fully released position is also cancelled when it is determined to execute other control regarding the operation of the accelerator pedal 20, or the acceleration of the vehicle 1, such as when it is determined that the accelerator pedal 20 is quickly depressed. Thus, the correction to increase the target acceleration is stopped according to the manner of operating the accelerator pedal 20.

When the target acceleration is corrected as described above, the target acceleration is multiplied by the amplification gain after reversal of the sign of the target acceleration; therefore, the increase of the absolute value of the target acceleration due to the multiplication of the target acceleration by the amplification gain takes place when the target acceleration shifts from a positive value representing an accelerating condition to a negative value representing a decelerating condition, or shifts from a negative value representing a decelerating condition to a positive value representing an accelerating condition. Thus, when the accelerator pedal 20 is operated at a high speed, the absolute value of the target acceleration is increased when the direction of acceleration changes; therefore, an elevation change in the acceleration is less likely to occur or prevented from occurring while the acceleration is increased. Consequently, the vehicle control system makes the driver less likely or unlikely to feel uncomfortable during driving of the vehicle 1, while achieving a desired acceleration.

Figure 10:
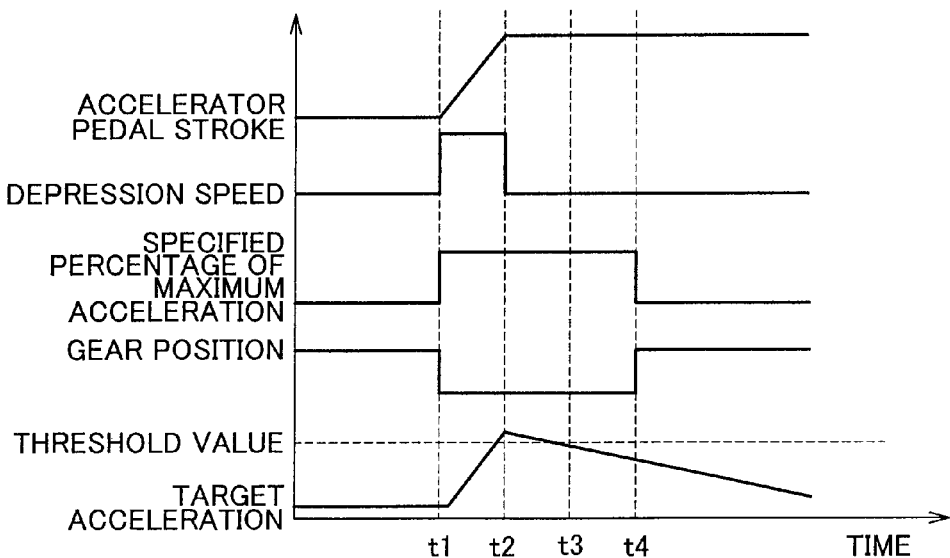
FIG. 10 is an explanatory view illustrating the case where the vehicle control system of the embodiment specifies the percentage of the maximum acceleration so as to select a gear position of an automatic transmission.

In the vehicle control system 2 according to the illustrated embodiment, when the accelerator pedal 20 is quickly depressed or quickly released, the highest gear position is selected under shift control of the automatic transmission 15 for limiting the gear position selected upon shifting to the lower-speed gear position. However, the gear position may be limited to a gear position(s) other than the highest gear position. FIG. 10 is an explanatory view illustrating the case where the gear position is selected by specifying the percentage of the maximum acceleration. As one example of shift control executed when the gear position to which the automatic transmission 15 is shifted is limited by selecting a gear position(s) other than the highest gear position, upon quick depression or quick release of the accelerator pedal 10, control executed upon quick depression of the accelerator pedal 20 will be explained. Under the shift control, when it is determined that quick depression of the accelerator pedal 20 takes place, the highest gear position as a gear position in which the target acceleration can be achieved is not selected, but a gear position in which an even larger acceleration than the target acceleration can be achieved is selected.

More specifically, the control correcting unit 34 calculates the maximum acceleration that can be generated in the current running conditions, based on the vehicle speed detected by the vehicle speed sensor, for example, and calculates what percentage of the maximum acceleration is requested or desired to be obtained, based on the accelerator pedal stroke as an operating state of the accelerator pedal 20 acquired by the accelerator stroke acquiring unit 32. For the calculations, the maximum acceleration relative to the vehicle speed is set in advance, and the relationship between the accelerator pedal stroke and the percentage of the maximum acceleration equivalent to the requested acceleration, with respect to each vehicle speed, is set in advance, and stored in the form of a map in the storage unit 40 of the ECU 30. The control correcting unit 34 calculates the percentage of the maximum acceleration corresponding to the current accelerator pedal stroke, based on the map and the detected vehicle speed and accelerator pedal stroke. Namely, the control correcting unit 34 performs the above calculation using the map, so as to specify what percentage of the maximum acceleration is desired to be obtained according to the accelerator pedal stroke (FIG. 10, t1).

While the control correcting unit 34 specifies the percentage of the maximum acceleration based on the accelerator pedal stroke in the above manner, the acceleration represented by the percentage is a larger value than the target acceleration calculated based on the accelerator pedal stroke, and the target acceleration subjected to the increasing correction.

Thus, the control correcting unit 34 specifies what percentage of the maximum acceleration is desired to be obtained, based on the accelerator pedal stroke, and selects the gear position in which the acceleration represented by the specified percentage of the maximum acceleration can be achieved. Since the acceleration represented by the specified percentage of the maximum acceleration is larger than the target acceleration, the gear position thus selected is a lower-speed gear position than the highest gear position used in the control performed by the vehicle control system 2 of the illustrated embodiment, or is equal to the highest gear position.

The gear position selected by the control correcting unit 34 is transmitted to the shift control unit 36, and the shift control unit 36 controls the automatic transmission 15 so that the automatic transmission 15 is shifted down to the selected gear position. In this case, the gear position to which, the automatic transmission 15 is shifted down is a lower-speed gear position than the current gear position, and is also a gear position equal to or lower than the highest gear position, thus permitting the vehicle 1 after shifting to generate an acceleration equal to or larger than the target acceleration. Therefore, when the accelerator pedal 20 is further depressed in this gear position, an acceleration equal to or larger than the target acceleration calculated in the above control can be generated.

The control for specifying the percentage of the maximum acceleration and changing the gear position when it is determined that the accelerator pedal 20 is quickly depressed is cancelled (FIG. 10, t4), when the operating speed of the accelerator pedal 20 is lower, than the operating speed based on which quick depression is determined, and the target acceleration is kept smaller than a predetermined threshold value for a period of time equal to or longer than a given period of time, as is the case with the control for shifting the automatic transmission to the highest gear position in the vehicle control system 2 of the illustrated embodiment.

Thus, when the gear position selected upon shifting to a lower-speed gear position is limited where the operating speed of the accelerator pedal 20 is higher than the given operating speed, the gear position that permits some excess driving force to be generated can be selected by specifying the percentage of the maximum acceleration based on the operating condition of the accelerator pedal 20. Therefore, even when the accelerator pedal 20 is depressed by a further degree after shifting of the automatic transmission 15, the driving force corresponding to the thus increased accelerator pedal stroke can be generated in the selected gear position. Consequently, it is possible to generate a desired acceleration without increasing the frequency of shifting of the automatic transmission 15 from one gear position to another gear position.

Figure 11:
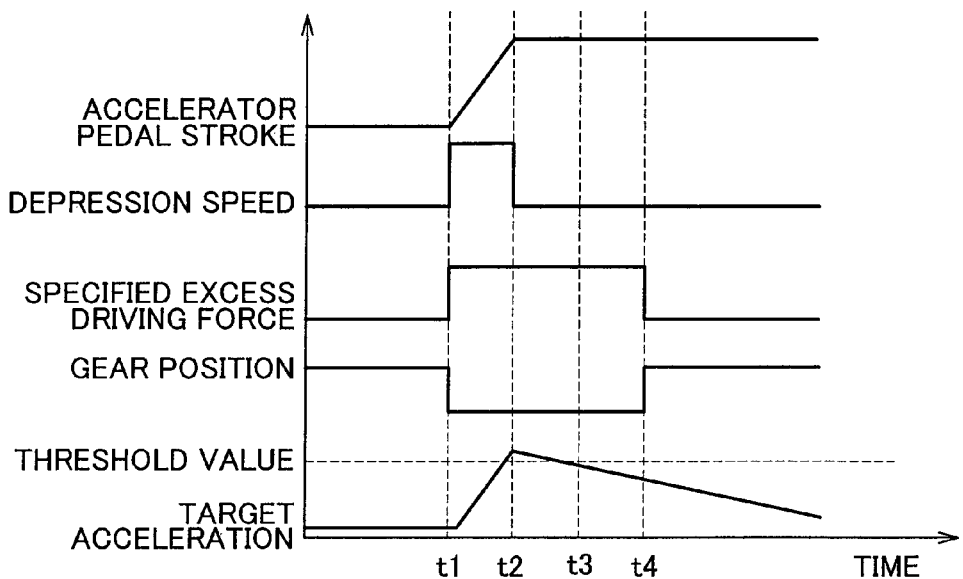
FIG. 11 is an explanatory view illustrating the case where the vehicle control system of the embodiment specifies excess driving force so as to select a gear position of an automatic transmission.

When the shift control of the automatic transmission 15 is performed by limiting the gear position selected upon shifting to a lower-speed gear position, the gear position other than the highest gear position may be selected by a method other than specifying the percentage of the maximum acceleration. FIG. 11 is an explanatory view illustrating the case where the gear position is selected by specifying excess driving force. As another example of the case where a gear position other than the highest gear position is selected in the shift control under which the gear position selected upon shifting to a lower-speed gear position is limited when it is determined that the accelerator pedal 20 is quickly depressed or quickly released, the gear position may be selected using excess driving force when it is determined that the accelerator pedal 20 is quickly depressed or quickly released. For example, control executed when the accelerator pedal 20 is quickly depressed will be described. As shown in FIG. 11, the gear position may be selected based on the driving force, when the depression speed of the accelerator pedal 20 is higher than a given operating speed.

More specifically, when it is determined that the accelerator pedal 20 is quickly depressed, the control correcting unit 34 calculates target driving force as driving force with which the target acceleration can be achieved, based on the target acceleration calculated based on the accelerator pedal stroke, or the target acceleration subjected to the above-mentioned increasing correction. Furthermore, the control correcting unit 34 calculates excess driving force that is desired to be provided relative to the target driving force, based on the accelerator pedal stroke as an operating condition of the accelerator pedal 20 when quick depression of the accelerator pedal 20 is determined. The calculation of the excess driving force is also performed based on set values stored in the storage unit 40 of the ECU 30, in the same manner as the calculation for specifying the percentage of the maximum acceleration.

Namely, the relationship between the accelerator pedal stroke and the excess driving force with respect to each vehicle speed is set in advance and stored in the form of a map in the storage unit 40 of the ECU 30, and the control correcting unit 34 calculates the excess driving force corresponding to the current accelerator pedal stroke, based on the map and the detected vehicle speed and accelerator pedal stroke. Namely, the control correcting unit 34 performs this calculation using the map, so as to specify what degree or amount of excess driving force relative to the target driving force is desired to be obtained, according to the accelerator pedal stroke. The excess driving force thus specified may be expressed by the proportion, such as %, of the excess driving force relative to the target driving force, or a numerical value in the unit Nm, for example, representing the desired excess driving force relative to the target driving force (FIG. 11, t1).

While the control correcting unit 34 specifies the excess driving force relative to the target driving force, based on the accelerator pedal stroke, the acceleration that can be generated using the excess driving force is larger than the target acceleration that can be generated using the target driving force calculated from the accelerator pedal stroke, or the target acceleration subjected to the above-mentioned increasing correction.

The control correcting unit 34 calculates and specifies the excess driving force relative to the target driving force, based on the accelerator pedal stroke, and selects the gear position in which the specified excess driving force can be achieved. Since the acceleration that can be generated with the excess driving force thus specified relative to the target driving force is larger than the target acceleration, the gear position thus selected is a lower-speed gear position than the highest gear position used in the control performed by the vehicle control system 2 of the illustrated embodiment, or is equal to the highest gear position. Therefore, when the automatic transmission 15 is shifted down to the selected gear position, an acceleration equal to or larger than the target acceleration calculated under the above control can be generated if the accelerator pedal 20 is depressed by a further degree in the gear position established after shifting, as in the case where the gear position is selected by specifying the percentage of the maximum acceleration as described above.

The control for selecting the gear position by specifying the excess driving force relative to the target driving force upon quick depression of the accelerator pedal 20 is also cancelled (FIG. 11, t4) when the operating speed of the accelerator pedal 20 is lower than the operating speed based on which quick depression is determined, and the target acceleration is kept smaller than a predetermined threshold value for a period of time equal to or longer than a given period of time.

As described above, when the gear position selected upon shifting to a lower-speed gear position is limited, the excess driving force relative to the target driving force calculated based on the accelerator pedal stroke is calculated further based on the accelerator pedal stroke, and the gear position in which the excess driving force can be achieved is selected. In this case, the gear position in which an adequate margin of driving force is provided with improved reliability can be selected based on the excess driving force. Consequently, it is possible to generate a desired acceleration, without increasing the frequency of shifting the automatic transmission 15 from one gear position to another gear position.

The control under which the percentage of the maximum acceleration is specified or the excess driving force relative to the target driving force is specified so as to select the gear position and shift the automatic transmission to the selected gear position may be cancelled when the actual acceleration, rather than the target acceleration, is kept smaller than a predetermined threshold value for a period of time equal to or longer than a given period of time, as is the case with the control under which the highest gear position is selected for shifting. Also, the same control may be cancelled when the operating speed of the accelerator pedal 20 is lower than the operating speed based on which quick depression or quick release is determined, and variations in the vehicle speed within a given period of time are smaller than a given set value.

When the accelerator pedal 20 is quickly released, the automatic transmission 15 is shifted down to the gear position selected based on the specified percentage of the maximum acceleration or the specified excess driving force relative to the target driving force, after the accelerator pedal 20 is released to the fully released position, as in the case of the downshift to the highest gear position. As a result, shifting can be accomplished and a desired acceleration can be generated, without causing the driver to feel uncomfortable during driving of the vehicle 1.

Figure 12:
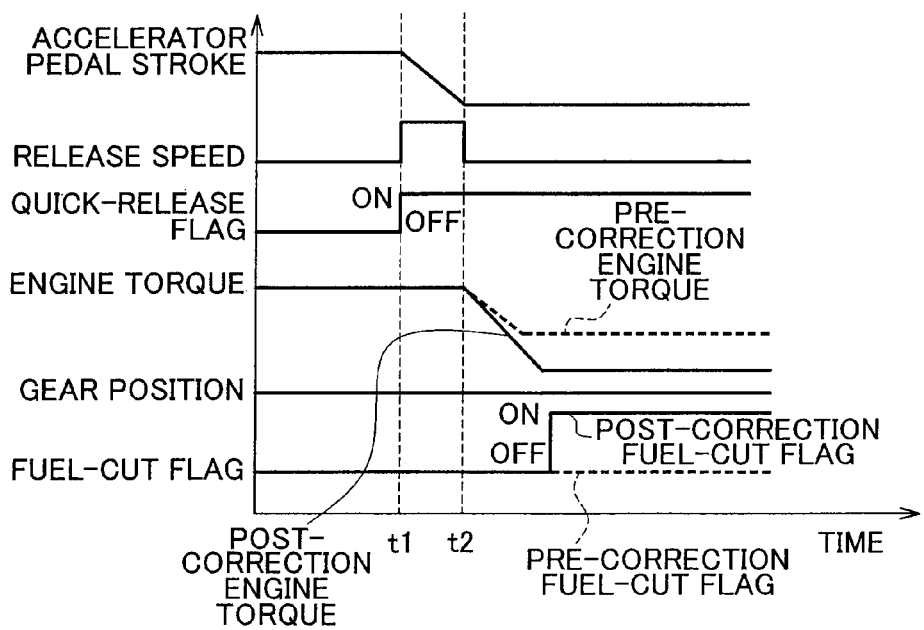
FIG. 12 is an explanatory view showing fuel-cut conditions when the accelerator pedal is quickly released in the vehicle in which the fuel cut control is inhibited when the automatic transmission is placed in a low gear position.

In some types of vehicle 1, fuel cut control is inhibited when the automatic transmission 15 is placed in a low gear position, so as to curb or prevent an excessive deceleration, or variations in the acceleration upon return from the fuel cut control. In this type of vehicle 1, when it is determined that the accelerator pedal 20 is quickly released, control executed upon quick release may permit fuel cut control to be executed while the automatic transmission 15 is in a low gear position. FIG. 12 is an explanatory view showing fuel cut conditions when the accelerator pedal is quickly released in the vehicle in which the fuel cut control is inhibited in a low gear position. Namely, in the vehicle 1 as described above, fuel cut control is inhibited during deceleration when the automatic transmission 15 is placed in a low gear position; therefore, engine torque is kept at a certain magnitude even when the accelerator pedal 20 is released so as to decelerate the vehicle. However, when the accelerator pedal 20 is quickly released in the vehicle 1 that performs the control as described above, it can be determined that the driver requests a large deceleration; therefore, the engine torque is reduced to such a magnitude that permits fuel cut control to be implemented.

Namely, when it is determined that the accelerator pedal 20 is quickly released (FIG. 12, t1), post-correction engine torque as engine torque that is corrected so as to permit fuel cut control even during deceleration in a low gear position is smaller than pre-correction engine torque as engine torque that is not subjected to the above correction (FIG. 12, t2). Therefore, the fuel-cut flag is kept in the OFF state when the engine torque is the pre-correction engine torque, but is switched to the ON state when the engine torque is the post-correction engine torque. Thus, when the accelerator pedal 20 is quickly released, the fuel cut control is performed even when the automatic transmission 15 is in a lower gear position, so that an even larger deceleration can be achieved, and the driver's request can be satisfied more adequately. Also, the fuel efficiency is improved because of an expansion or increase of an operating region in which the fuel cut control is performed.

In the vehicle control system 2 of the illustrated embodiment, the target acceleration is calculated according to the operation of the accelerator pedal 20, and control that is different from acceleration control executed upon a normal operation of the accelerator pedal 20 is performed when the operating speed of the accelerator pedal 20 is higher than a given speed. However, the target acceleration may be controlled in different manners depending on the accelerator pedal stroke. For example, the drive system 10 may be controlled, based on the relationship between the requested acceleration and the accelerator pedal stroke, which is calculated using, as a condition, the relationship between the accelerator pedal stroke and the vehicle speed, which relationship is determined or defined by the relationship between the vehicle speed and the acceleration with respect to a given accelerator pedal stroke, for example.

In this case, when the drive system control unit 33 calculates the target acceleration, the relationship between the requested acceleration and the accelerator pedal stroke, which includes, as a condition, the minimum acceleration generated when the accelerator pedal is depressed from an idling state, is determined or defined in the form of a map, or the like, and the relationship between the requested acceleration and the accelerator pedal stroke is complemented, in view of maximum output characteristics from a given accelerator pedal stroke to the maximum accelerator pedal stroke. Namely, in a region where the accelerator pedal stroke is large, the relationship between the accelerator pedal stroke and the requested acceleration is determined so as to satisfy the maximum generable acceleration, for linear complementation of the relationship between the required acceleration and the accelerator pedal stroke. Thus, the accelerator controllability can be designed in each of a region of the accelerator pedal stroke from the fully released position to a particular accelerator pedal stroke, and a region from the particular accelerator pedal stroke to the fully depressed position, while assuring the maximum output characteristic of the vehicle 1.

More specifically, the target acceleration is calculated in a region from the fully released position to the particular accelerator pedal stroke, so that the acceleration of the vehicle 1 in response to the driver's operation on the accelerator pedal meets or agrees with the driver's sensibility, and the target acceleration is calculated in a region from the particular accelerator pedal stroke to the fully depressed position, so as to appropriately achieve the maximum generable acceleration. Also, in a region where the accelerator pedal stroke is close to or equal to the fully depressed position, the driver requests a large acceleration, and the maximum generable acceleration is likely to be generated; therefore, in this region, too, the target acceleration that meets the driver's sensibility in response to the driver's operation on the accelerator pedal can be calculated. In other words, the driver's intention can be reflected by the target acceleration throughout the entire region of the accelerator pedal stroke.

The combination of the control that enables the driver's intention to be reflected by the target acceleration throughout the entire region of the accelerator pedal stroke, with the control executed by the vehicle control system 2 of the illustrated embodiment upon quick depression or quick release of the acceleration pedal 20, makes it possible to obtain a target acceleration that meets the driver's sensibility, based on the manner of operating the accelerator pedal 20, such as the operating speed of the accelerator pedal 20, as well as the accelerator pedal stroke. Consequently, the acceleration requested by the driver can be achieved with improved reliability.

While the vehicle control system 2 of the illustrated embodiment performs coordination control of the engine 12 and the alternator only when quick depression of the accelerator pedal is determined, the coordination control of the engine 12 and the alternator may also be performed when quick release of the accelerator pedal 12 is determined. If the required torque varies by a large degree, or varies at a high rate, the control for coordination between the torque generated by the engine 12 and the alternator torque is performed, irrespective of whether the accelerator pedal 12 is quickly depressed or quickly released, so that the required torque can be achieved with good response. Since the alternator torque has good responsiveness, the required torque may be divided by frequency into a high-frequency portion and a low-frequency portion, and the high-frequency portion may be provided by alternator torque, while the low-frequency portion may be provided by the torque of the engine 12. Namely, when the required torque changes frequently, low-frequency large variations in the required torque are realized by the torque of the engine 12, and high-frequency subtle or small variations are realized by the alternator torque. As a result, quick movements of a throttle valve (not shown) of the engine 12 are suppressed, and quick response is achieved while reducing the load of the throttle valve. Also, the coordination control of the torque of the engine 12 and the alternator torque makes it possible to extend the range between the maximum and minimum driving forces that can be generated, so that a large acceleration or deceleration can be obtained. Consequently, a desired acceleration can be generated with improved reliability.

In the vehicle control system 2 of the illustrated embodiment, the target acceleration is corrected to be increased using an amplification gain when the accelerator pedal 20 is quickly depressed, and the target acceleration is corrected to be increased using an offset value when the accelerator pedal 20 is quickly released. However, the same control may be performed upon quick depression and quick release, or the control executed upon quick depression may be interchanged with the control executed upon quick release. While the control of making an increasing correction on the target acceleration after reversal of the sign of the target acceleration is executed when the accelerator pedal 20 is quickly released in the above description referring to FIG. 9, the control of making an increasing correction on the target acceleration after reversal of the sign of the target acceleration may be executed when the accelerator pedal 20 is quickly depressed. It is preferable that the above-described control operations to correct the target acceleration by increasing the absolute value of the target acceleration upon quick depression or quick release of the accelerator pedal 20 are combined as appropriate, depending on the construction of the vehicle 1 on which the vehicle control system 2 is installed, and the mode or manner of using the vehicle 1.

As described above, the vehicle control system according to this invention is useful to a vehicle that is able to change driving force generated in relation to the accelerator pedal stroke, and, in particular, is suitably used as a vehicle control system that performs running control by calculating a target output value based on the accelerator pedal stroke.

The invention claimed is:

1. A vehicle control system comprising:
a controller that performs running control of a vehicle that includes a drive system by (i) determining a target output value based on a driver's operation of an accelerator member, (ii) determining a second target output value by multiplying the target output value by a gain, and (iii) controlling a driving force to be generated by the drive system based on the second target output value, wherein
the controller determines the target output value based on an operating amount of the accelerator member, and sets the gain to a value corresponding to an operation of the accelerator member,
the controller sets the gain to a value which is greater than 1 when an operating speed of the accelerator member is greater than a predetermined value and the controller returns the gain to an initial value when the target output value is about zero,
the controller multiplies the target output value by the gain so that (1) an absolute value of the target output value is increased when the gain has been set to the value which is greater than 1, and (2) after the gain has been set to the value which is greater than 1 and when the target output value subsequently becomes close to zero, the controller returns the gain by which the target output value is multiplied to a condition in which the absolute value of the target output value is not increased, when an operating speed of the accelerator member in a direction in which the accelerator member is released is higher than a given operating speed, the controller conducts an increasing correction to increase the absolute value of the target output value, and stops the increasing correction depending on a manner of operating the accelerator member, and in the case where the increasing correction is conducted when the operating speed of the accelerator member in the direction in which the accelerator member is released is higher than the given operating speed, the controller stops the increasing correction when the operation of the accelerator member is stopped partway.

2. The vehicle control system according to claim 1, wherein the increasing correction is to increase the absolute value of the target output value by multiplying the target output value by the gain.

3. The vehicle control system according to claim 1, wherein the increasing correction is to increase the absolute value of the target output value by shifting the target output value by an offset value.

4. The vehicle control system according to claim 1, wherein the initial value is a value of 1.

5. A vehicle control system comprising:

a controller that performs running control of a vehicle that includes a drive system by (i) determining a target output value based on a driver's operation of an accelerator member, (ii) determining a second target output value by multiplying the target output value by a gain, and (iii) controlling a driving force to be generated by the drive system based on the second target output value, wherein the controller determines the target output value based on an operating amount of the accelerator member, and sets the gain to a value corresponding to an operation of the accelerator member, the controller sets the gain to a value which is greater than 1 when an operating speed of the accelerator member is greater than a predetermined value and the controller returns the gain to an initial value when the target output value is about zero, the controller multiplies the target output value by the gain so that (1) an absolute value of the target output value is increased when the gain has been set to the value which is greater than 1, and (2) after the gain has been set to the value which is greater than 1 and when the target output value subsequently becomes close to zero, the controller returns the gain by which the target output value is multiplied to a condition in which the absolute value of the target output value is not increased, when an operating speed of the accelerator member in a direction in which the accelerator member is released is higher than a given operating speed, the controller conducts an increasing correction to increase the absolute value of the target output value, and stops the increasing correction depending on a manner of operating the accelerator member, and in the case where the increasing correction is conducted when the operating speed of the accelerator member in the direction in which the accelerator member is released is higher than the given operating speed, and the accelerator member is returned to the fully released position, the controller stops the increasing correction when the accelerator member is depressed again.

6. The vehicle control system according to claim 5, wherein the increasing correction is to increase the absolute value of the target output value by multiplying the target output value by the gain.

7. The vehicle control system according to claim 5, wherein the increasing correction is to increase the absolute value of the target output value by shifting the target output value by an offset value.

8. The vehicle control system according to claim 5, wherein the initial value is a value of 1.

\* \* \* \* \*